United States Patent
Laver

[11] Patent Number: 6,103,794
[45] Date of Patent: Aug. 15, 2000

[54] STABILIZERS FOR POWDER COATINGS

[75] Inventor: Hugh Stephen Laver, Reinach, Switzerland

[73] Assignee: Ciba Specialty Chemicals Corporation, Tarrytown, N.Y.

[21] Appl. No.: 09/133,797

[22] Filed: Aug. 13, 1998

[30] Foreign Application Priority Data

Aug. 19, 1997 [CH] Switzerland ............ 1944/97

[51] Int. Cl.$^7$ ..................... C08K 5/45
[52] U.S. Cl. ............ 524/84; 427/461; 427/469; 524/111; 524/131; 524/291
[58] Field of Search .......... 524/291, 84, 111, 524/131; 427/461, 469

[56] References Cited

U.S. PATENT DOCUMENTS

| | | | |
|---|---|---|---|
| 4,107,137 | 8/1978 | Proux et al. | 524/291 |
| 4,168,387 | 9/1979 | Cottman | 524/291 |
| 4,173,658 | 11/1979 | Bax | 525/437 |
| 4,365,032 | 12/1982 | Yosizato et al. | 524/99 |
| 4,414,408 | 11/1983 | Cottman | 524/289 |
| 4,562,281 | 12/1985 | Takahashi et al. | 560/104 |
| 4,774,274 | 9/1988 | Takata et al. | 524/291 |
| 5,097,006 | 3/1992 | Kapilow et al. | 524/91 |
| 5,238,745 | 8/1993 | Valet et al. | 428/413 |
| 5,246,777 | 9/1993 | Ishii et al. | 524/291 |
| 5,602,196 | 2/1997 | Gilg et al. | 524/171 |
| 5,616,780 | 4/1997 | Pitteloud et al. | 560/118 |
| 5,708,039 | 1/1998 | Daly | 524/289 |
| 5,719,212 | 2/1998 | Nakae et al. | 523/451 |
| 5,847,057 | 12/1998 | Kaplan et al. | 560/140 |

FOREIGN PATENT DOCUMENTS

| | | |
|---|---|---|
| 2069719 | 12/1992 | Canada . |
| 0079806 | 5/1983 | European Pat. Off. . |
| 0500323 | 8/1992 | European Pat. Off. . |
| 7118568 | 5/1995 | Japan . |
| 7258462 | 10/1995 | Japan . |

OTHER PUBLICATIONS

Derwent Abstr. 95–204070/27 for JP 7118568.
Derwent Abstr. 95–380188/49 for JP 7258462.
B. R. Baker et al., J. Org. Chem. 17, pp. 116–131, (1952).
Ullmann's Encyclopedia of Industrial Chemistry 5$^{th}$ Ed., vol. A18, pp. 438–444.
P. Babin et al., Bull. Soc. Chim. France, (1982), II–125—II–128.

*Primary Examiner*—Veronica P. Hoke
*Attorney, Agent, or Firm*—Kevin T. Mansfield

[57] ABSTRACT

A description is given of powder coating compositions comprising a) an organic film-forming binder and b) as stabilizer at least one compound of formula I

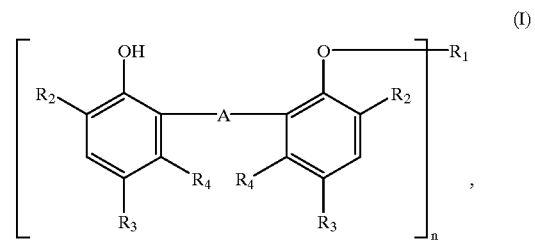

wherein the general symbols are as defined in claim 1. Using powder coating compositions stabilized in this manner reduces the discoloration of the coatings during heat-cures, in particular during gas furnace cures.

13 Claims, No Drawings

STABILIZERS FOR POWDER COATINGS

The present invention relates to powder coating compositions comprising an organic film-forming binder and as stabiliser at least one bisphenol ester derivative, and to the use thereof for reducing the discolouration of heat-curable powder coatings.

Powder coating is a known technology and is described, inter alia, in "Ullmann's Encyclopedia of Industrial Chemistry, Fifth, Completely revised Edition, Volume A 18", pages 438 to 444 (1991). In the powder coating process, a powder is generally fluidised with supply of air, electrostatically charged and applied to an earthed, preferably metallic substrate. The substrate is subsequently heated, in the course of which the adhering powder melts, coalesces and forms a coherent film on the metal surface. Since powder coating preferably operates without solvent, this technology is especially friendly to the environment.

The curing of the powder coating compositions at elevated temperature, in particular in a gas furnace, is not without difficulties. The nitrogen oxide gases present in the gas furnace often cause unwanted discolouration of the coating.

In the prior art, powder coating compositions are stabilised with a mixture of a sterically hindered phenol, such as the octadecyl ester of 3-(3,5-di-tert-butyl-4-hydroxyphenyl) propionic acid, and an organic phosphite, such as tris(2,4-di-tert-butylphenyl)phosphite. However, this stabilisation results in severe unwanted discolouration of the coating when the powder coating composition is cured at elevated temperature, in particular in a gas furnace. Said discolouration can be suppressed to some degree by foregoing the use of the sterically hindered phenol and by effecting the stabilisation only with an organic phosphate. However, stabilising the powder coating only with an organic phosphite has the disadvantage of greatly reducing the stability of the coating against oxidative attacks.

It is also desirable to stabilise powder coatings against overbaking. Such overbaking can occur, for example, if the conveyor belt in the heated furnace remains at standstill or if some parts require recoating because of coating defects.

The known stabilisers do not in every respect satisfy the stringent requirements that a stabiliser or a mixture of stabilisers should meet, in particular in terms of discolouration of heat-curable powder coating compositions, especially those curable in gas furnaces.

The use of bisphenol ester derivatives as stabilisers for organic polymers is known, inter alia, from U.S. Pat. No. 4,365,032; EP-A-0 079 806; U.S. Pat. No. 4,562,281; U.S. Pat. No. 4,774,274; EP-A-0 500 323; U.S. Pat. No. 5,602, 196; EP-A-0 716 076; U.S. Pat. No. 5,616,780 or EP-A-0 727 410.

The use of certain bisphenol ester derivatives as stabilisers for solvent-containing coatings is known, inter alia, from JP-A-07 118 568 (Derwent 95-204070/27) or JP-A-07 258 462 (Derwent 95-380188/49).

It has now been found that certain bisphenol ester derivatives are particularly suitable as stabilisers for reducing the discolouration of powder coating compositions which are heat-curable, especially in gas furnaces.

Accordingly, this invention relates to powder coating compositions, which comprise a) an organic film-forming binder, and b) as stabiliser at least one compound of formula I

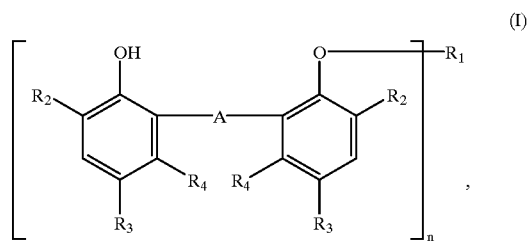

wherein, if n=1,
R$_1$ is hydrogen,

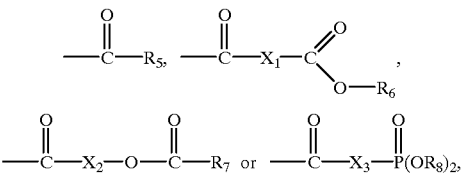

and if n=2,
R$_1$ is

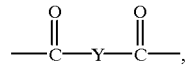

A is a direct bond, sulfur,

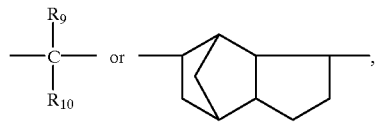

X$_1$ is a direct bond, C$_1$–C$_{24}$alkylene; C$_2$–C$_{24}$alkylene which is interrupted by oxygen, sulfur or

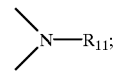

C$_2$–C$_{24}$alkenylene, C$_2$–C$_{20}$alkylidene, C$_7$–C$_{20}$phenylalkylidene, C$_5$–C$_{12}$cycloalkylene, C$_5$–C$_{12}$cycloalkenylene, C$_7$–C$_8$bicycloalkylene, unsubstituted or C$_1$–C$_4$alkyl-substituted phenylene,

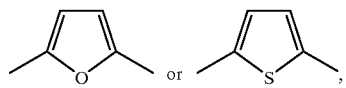

X$_2$ is C$_1$–C$_{24}$alkylene; C$_2$–C$_{24}$alkylene which is interrupted by oxygen, sulfur or

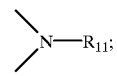

C$_2$–C$_{24}$alkenylene, C$_2$–C$_{20}$alkylidene, C$_7$–C$_{20}$phenylalkylidene, C$_5$–C$_{12}$cycloalkylene, $C_5$–$C_{12}$cycoalkenylene, $C_7$–$C_8$bicycloalkylene, unsubstituted or $C_1$–$C_4$alkyl-substituted phenylene,

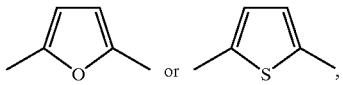

$X_3$ is $C_1$–$C_{24}$alkylene, $C_2$–$C_{20}$alkylidene, $C_7$–$C_{20}$phenylalkylidene or $C_5$–$C_{12}$cycloalkylene, Y is a direct bond, $C_1$–$C_{24}$alkylene; $C_2$–$C_{24}$alkylene which is interrupted by oxygen, sulfur or

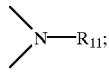

$C_2$–$C_{24}$alkenylene, $C_2$–$C_{20}$alkylidene, $C_7$–$C_{20}$phenylalkylidene, $C_5$–$C_{12}$cycloalkylene, $C_5$–$C_{12}$cycloalkenylene, $C_7$–$C_8$bicycloalkylene, unsubstituted or $C_1$–$C_4$alkyl-substituted phenylene,

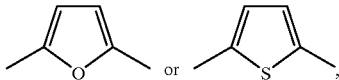

$R_2$ and $R_3$ are each independently of the other $C_1$–$C_{25}$alkyl, unsubstituted or $C_1$–$C_4$alkyl-substituted $C_5$–$C_{12}$cycloalkyl; $C_7$–$C_9$phenylalkyl, unsubstituted or $C_1$–$C_4$alkyl-substituted phenyl;

$R_4$ is hydrogen or methyl, $R_5$ is $C_1$–$C_{25}$alkyl; $C_2$–$C_{25}$alkyl which is interrupted by oxygen, sulfur or

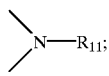

$C_2$–$C_{24}$alkenyl; $C_8$–$C_{30}$phenylalkenyl which is unsubstituted or substituted at the phenyl ring by halogen, $C_1$–$C_4$alkyl, $C_1$–$C_4$alkoxy or $C_1$–$C_4$alkylthio; unsubstituted or $C_1$–$C_4$alkyl-substituted $C_5$–$C_{12}$cycloalkyl; $C_8$–$C_{30}$phenylalkyl which is unsubstituted or substituted at the phenyl ring by halogen, $C_1$–$C_4$alkyl, $C_1$–$C_4$alkoxy or $C_1$–$C_4$alkylthio; phenyl which is unsubstituted or substituted by halogen, $C_1$–$C_4$alkyl, $C_1$–$C_4$alkoxy or $C_1$–$C_4$alkylthio;

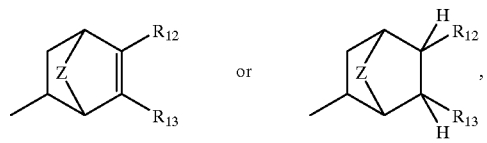

$R_6$ is $C_1$–$C_{25}$alkyl; $C_2$–$C_{25}$alkyl which is interrupted by oxygen, sulfur or

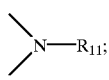

$C_2$–$C_{24}$alkenyl, unsubstituted or $C_1$–$C_4$alkyl-substituted $C_5$–$C_{12}$cycloalkyl; $C_7$–$C_9$phenylalkyl; phenyl which is unsubstituted or substituted by $C_1$–$C_4$alkyl, $C_1$–$C_4$alkoxy or $C_1$–$C_4$alkylthio;

$R_7$ is $C_1$–$C_{25}$alkyl; $C_2$–$C_{25}$alkyl which is interrupted by oxygen, sulfur or

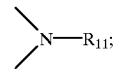

$C_2$–$C_{24}$alkenyl; $C_8$–$C_{30}$phenylalkenyl which is unsubstituted or substituted at the phenyl ring by halogen, $C_1$–$C_4$alkyl, $C_1$–$C_4$alkoxy or $C_1$–$C_4$alkylthio; unsubstituted or $C_1$–$C_4$alkyl-substituted $C_5$–$C_{12}$cycloalkyl; $C_9$–$C_{30}$phenylalkyl which is unsubstituted or substituted at the phenyl ring by halogen, $C_1$–$C_4$alkyl, $C_1$–$C_4$alkoxy or $C_1$–$C_4$alkylthio; phenyl which is unsubstituted or substituted by $C_1$–$C_4$alkyl, $C_1$–$C_4$alkoxy or $C_1$–$C_4$alkylthio;

$R_8$ is $C_1$–$C_{25}$alkyl, $R_9$ and $R_{10}$ are each independently of the other hydrogen, $CF_3$, $C_1$–$C_{25}$alkyl or phenyl, or $R_9$ and $R_{10}$, together with the linking carbon atom, are a $C_5$–$C_{12}$cycloalkylidene ring which is unsubstituted or substituted by 1 to 3 $C_1$–$C_4$alkyl;

$R_{11}$ is hydrogen or $C_1$–$C_{18}$alkyl, $R_{12}$ is hydrogen or $C_1$–$C_4$alkyl, $R_{13}$ is hydrogen or $C_1$–$C_4$alkyl, Z is oxygen, methylene, ethylidene or

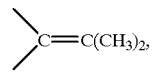

and n is 1 or 2.

$C_1$–$C_{14}$Alkylene is a branched or unbranched radical, for example methylene, ethylene, propylene, trimethylene, tetramethylene, pentamethylene, hexamethylene, heptamethylene, octamethylene, decamethylene, dodecamethylene or octadecamethylene. $C_1$–$C_{18}$Alkylene is preferred and $C_1$–$C_{12}$alkylene is particularly preferred, e.g. $C_1$–$C_8$alkylene. A particularly preferred meaning of $X_1$, $X_2$ and $X_3$ is, for example, $C_1$–$C_6$alkylene, in particular $C_1$–$C_4$alkylene, e.g. ethylene or methylene. A particularly preferred meaning of Y is, for example, $C_1$–$C_{18}$alkylene, in particular $C_2$–$C_{12}$alkylene.

$C_2$–$C_{24}$Alkylene which is interrupted by oxygen, sulfur or

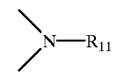

is, for example,

—$CH_2$—O—$CH_2$—, —$CH_2$—S—$CH_2$—, —$CH_2$—NH—$CH_2$—, —$CH_2$—N($CH_3$)—$CH_2$—, —$CH_2$—O—$CH_2CH_2$—O—$CH_2$—,

—$CH_2$—(O—$CH_2CH_2$—)$_2$O—$CH_2$—, —$CH_2$—(O—$CH_2CH_2$—)$_3$O—$CH_2$—, —$CH_2$—(O—$CH_2CH_2$—)$_4$O—$CH_2$—,

—$CH_2CH_2$—O—$CH_2CH_2$—O—$CH_2CH_2$— or —$CH_2CH_2$—S—$CH_2CH_2$—.

$C_2$–$C_{24}$Alkenylene is typically vinylene, methylvinylene, octenylethylene or dodecenylethylene. A preferred meaning of $X_1$, $X_2$ and Y is, for example, $C_2$–$C_{18}$alkenylene, in particular $C_2$–$C_{12}$alkenylene, e.g. $C_2$–$C_8$alkenylene. A particularly preferred meaning of $X_1$ and Y is, for example, $C_2$–$C_6$alkenylene, in particular $C_2$–$C_4$alkenylene.

Alkylidene containing 2 to 20 carbon atoms is typically ethylidene, propylidene, butylidene, pentylidene, 4-methylpentylidene, heptylidene, nonylidene, tridecylidene, nonadecylidene, 1-methylethylidene, 1-ethylpropylidene or 1-ethylpentylidene. A preferred meaning of $X_1$, $X_2$, $X_3$ and Y is, for example, $C_2$–$C_{12}$alkylidene, in particular $C_2$–$C_{10}$alkylidene, e.g. $C_2$–$C_8$alkylidene. A particularly preferred meaning of $X_2$ is $C_2$–$C_6$alkylidene, in particular $C_2$–$C_4$alkylidene, e.g. ethylidene.

Phenylalkylidene containing 7 to 20 carbon atoms is typically benzylidene, 2-phenylethylidene, 3-phenylpropylidene, 4-phenylbutylidene, 5-phenylpentylidene or 1-phenyl-2-hexylidene. A preferred meaning of $X_1$, $X_2$, $X_3$ and Y is, for example, $C_7$–$C_{18}$phenylalkylidene, in particular $C_7$–$C_{12}$phenylalkylidene, e.g. $C_7$–$C_{10}$phenylalkylidene.

$C_5$–$C_{12}$Cycloalkylene is typically cyclopentylene, cyclohexylene, cycloheptylene, cyclooctylene, cyclononylene, cyclodecylene, cycloundecylene or cyclododecylene. Cyclohexylene is preferred.

$C_5$–$C_{12}$Cycloalkenylene is typically cyclopentenylene, cyclohexenylene, cycicheptenylene, cyclooctenylene, cyclononenylene, cyclodecenylene, cycloundecenylene or cyclododecenylene. Cyclohexenylene is preferred.

$C_7$–$C_8$Bicycloalkylene is, for example, bicycloheptylene or bicyclooctylene.

Unsubstituted or $C_1$–$C_4$alkyl-substituted phenylene is typically 1,2-, 1,3-, 1,4-phenylene, 2-methyl-1,4-phenylene, 2-ethyl-1,4-phenylene, 2-propyl-1,4-phenylene or 2-butyl-1,4-phenylene. 1,4-Phenylene is preferred.

Alkyl containing up to 25 carbon atoms is a branched or unbranched radical, such as methyl, ethyl, propyl, isopropyl, n-butyl, sec-butyl, isobutyl, tert-butyl, 1,1-dimethyl-1-propyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl or docosyl. One of the preferred meanings of $R_2$ and $R_3$ is, for example, $C_1$–$C_{18}$alkyl, in particular $C_1$–$C_{12}$alkyl, e.g. $C_1$–$C_8$alkyl. A particularly preferred meaning of $R_2$ and $R_3$ is, for example, $C_1$–$C_6$alkyl, in particular $C_1$–$C_5$alkyl, e.g. tert-butyl or 1,1-dimethyl-1-propyl. A preferred meaning of $R_5$ is typically $C_1$–$C_{18}$alkyl, in particular $C_1$–$C_{12}$alkyl. A preferred meaning of $R_6$ is typically $C_1$–$C_{18}$alkyl, in particular $C_1$–$C_{12}$alkyl, e.g. $C_1$–$C_8$alkyl. A preferred meaning of $R_7$ $R_8$, $R_9$ and $R_{10}$ is typically $C_1$–$C_{18}$alkyl, in particular $C_1$–$C_{12}$alkyl, e.g. $C_1$–$C_8$alkyl. A particularly preferred meaning of $R_8$, $R_9$ and $R_{10}$ is typically $C_1$–$C_6$alkyl, in particular $C_1$–$C_4$alkyl, e.g. methyl or ethyl. A preferred meaning of $R_{11}$ is typically $C_1$–$C_{12}$alkyl, in particular $C_1$–$C_8$alkyl, e.g. $C_1$–$C_4$alkyl. A preferred meaning of $R_{12}$ and $R_{13}$ is typically $C_1$–$C_4$alkyl, in particular methyl or ethyl.

$C_2$–$C_{25}$Alkyl which is interrupted by oxygen, sulfur or

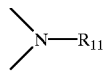

is, for example,

CH$_3$—O—CH$_2$—, CH$_3$—O—CH$_2$CH$_2$—, CH$_3$—S—CH$_2$—, CH$_3$—NH—CH$_2$—, CH$_3$—N(CH$_3$)—CH$_2$—, CH$_3$—O—CH$_2$CH$_2$—O—CH$_2$, CH$_3$CH$_2$—O—CH$_2$CH$_2$—O—CH$_2$CH$_2$—, CH$_3$—(O—CH$_2$CH$_2$—)$_2$O—CH$_2$CH$_2$—, CH$_3$—(O—CH$_2$CH$_2$—)$_3$O—CH$_2$CH$_2$— or CH$_3$—(O—CH$_2$CH$_2$—)$_4$O—CH$_2$—.

Unsubstituted or $C_1$–$C_4$alkyl-substituted $C_5$–$C_{12}$cycloalkyl is typically cyclopentyl, methylcyclopentyl, dimethylcyclopentyl, cyclohexyl, methylcyclohexyl, dimethylcyclohexyl, trimethybyclohexyl, tert-butylcyclohexyl, cycloheptyl, cyclooctyl, cyclononyl, cyclodecyl, cycloundecyl or cyclododecyl. A preferred meaning of $R_2$ and $R_3$ is, for example, unsubstituted or methyl-substituted $C_5$–$C_8$cycloalkyl, in particular unsubstituted or methyl-substituted cyclohexyl, e.g. cyclohexyl or α-methylcyclohexyl. A preferred meaning of $R_5$, $R_6$ and $R_7$ is, for example, $C_5$–$C_8$cycloalkyl, in particular $C_5$–$C_6$cycloalkyl, e.g. cyclohexyl.

$C_7$–$C_9$Phenylalkyl is, for example, benzyl, α-methylbenzyl, α,α-dimethylbenzyl or 2-phenylethyl. Benzyl or α,α-dimethylbenzyl are preferred.

Phenyl which is substituted by halogen $C_1$–$C_4$alkyl, $C_1$–$C_4$alkoxy or $C_1$–$C_4$alkylthio and which preferably contains 1 to 3, more preferably 1 or 2, alkyl groups, is typically o-, m- or p-methylphenyl, o-, m- or p-methoxyphenyl, o-, m- or p-chlorophenyl, o-, m- or p-methylthiophenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

Alkenyl containing 2 to 24 carbon atoms is a branched or unbranched radical, such as vinyl, propenyl, 2-butenyl, 3-butenyl, isobutenyl, n-2,4-pentadienyl, 3-methyl-2-butenyl, n-2-octenyl, n-2-dodecenyl, isododecenyl, oleyl, n-2-octadecenyl or n-4-octadecenyl. Alkenyl containing 2 to 18, preferably 2 to 10, carbon atoms is preferred.

$C_8$–$C_{30}$Phenylalkenyl which is unsubstituted or substituted at the phenyl ring by halogen, $C_1$–$C_4$alkyl, $C_1$–$C_4$alkoxy or $C_1$–$C_4$alkylthio is a branched or unbranched radical such as styryl, 2-(p-methoxyphenyl)-1-ethenyl, 2-(p-chlorophenyl)-1-ethenyl, 2-(p-methylphenyl)-1-ethenyl, 2-(p-methylthiophenyl)-1-ethenyl, 2-phenyl-2-methyl-1-ethenyl, 3-phenyl-1-propenyl, 4-phenyl-1-butenyl, 5-phenyl-1-pentenyl, 6-phenyl-1-hexenyl, 7-phenyl-1-heptenyl or 8-phenyl-1-octenyl.

$C_8$–$C_{30}$Phenylalkyl which is unsubstituted or substituted at the phenyl ring by halogen, $C_1$–$C_4$alkyl, $C_1$–$C_4$alkoxy or $C_1$–$C_4$alkylthio is a branched or unbranched radical such as phenylethyl, 2-(p-methoxyphenyl)ethyl, 2-(p-chlorophenyl)ethyl, 2-(p-methylphenyl)ethyl, 2-(p-methylthiophenyl)ethyl, 2-phenyl-2-methylethyl, 3-phenylpropyl, 4-phenylbutyl, 5-phenylpentyl, 6-phenylhexyl, 7-phenylheptyl or 8-phenyloctyl.

A $C_5$–$C_{12}$cycloalkylidene ring which is substituted by $C_1$–$C_4$alkyl and which preferably contains 1 to 3, more preferably 1 or 2, branched or unbranched alkyl group radicals is typically cyclopentylidene, methylcyclopentylidene, dimethylcyclopentylidene, cyclohexylidene, methylcyclohexylidene, dimethylcyclohexylidene, trimethylcyclohexylidene, tert-butylcydohexylidene, cycloheptylidene, cyclooctylidene, cyclononylidene, cyclodecylidene, cycloundecylidene or cyclododecylidene. Cyclohexylidene and tert-butylcyclohexylidene are preferred.

Halogen is typically chloro, bromo or iodo. Chloro is preferred.

Interesting powder coating compositions are those comprising as component (b) at least one compound of formula I, wherein, if n=1, $R_1$ is phenyl which is unsubstituted or substituted in para-position by $C_1$–$C_{18}$alkylthio or di($C_1$–$C_4$alkyl)amino; mono- to penta-substituted alkylphenyl containing a total of at most 18 carbon atoms in the 1 to alkyl substituents; naphthyl, biphenyl, terphenyl, phenanthryl, anthryl, fluorenyl, carbazolyl, thienyl, pyrrolyl, phenothiazinyl or 5,6,7,8-tetrahydronaphthyl, each of which is unsubstituted or substituted by $C_1$–$C_4$alkyl, $C_1$–$C_4$alkoxy, $C_1$–$C_4$alkylthio, hydroxy or amino.

Preferred powder coating compositions are those comprising as component (b) at least one compound of formula I, wherein $X_1$ is a direct bond, $C_1$–$C_{18}$alkylene; $C_2$–$C_{18}$alkylene which is interrupted by oxygen, sulfur or

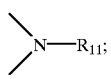

$C_2$–$C_{18}$alkenylene, $C_2$–$C_{12}$alkylidene, $C_7$–$C_{12}$phenylalkylidene, $C_5$–$C_8$cycloalkylene, $C_5$–$C_8$cycloalkenylene, phenylene, or

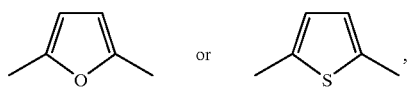

$X_2$ is $C_1$–$C_{18}$alkylene; $C_2$–$C_{18}$alkylene which is interrupted by oxygen, sulfur or

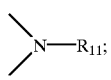

$C_2$–$C_{18}$alkenylene, $C_2$–$C_{12}$alkylidene, $C_7$–$C_{12}$phenylalkylidene, $C_5$–$C_8$cycloalkylene, $C_5$–$C_8$cycloalkenylene, phenylene, or

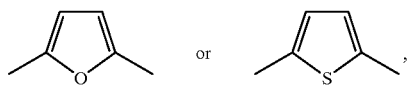

$X_3$ is $C_1$–$C_{18}$alkylene, $C_2$–$C_{12}$alkylidene, $C_7$–$C_{12}$phenylalkylidene or $C_5$–$C_8$cycloalkylene, Y is a direct bond, $C_1$–$C_{18}$alkylene; $C_2$–$C_{18}$alkylene which is interrupted by oxygen, sulfur or

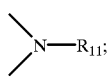

$C_{18}$alkenylene, $C_2$–$C_{12}$alkylidene, $C_7$–$C_{12}$phenylalkylidene, $C_5$–$C_8$cycloalkylene, $C_5$–$C_8$cycloalkenylene, phenylene,

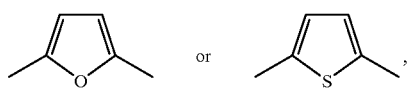

$R_2$ and $R_3$ are each independently of the other $C_1$–$C_{18}$alkyl, unsubstituted or $C_1$–$C_4$alkyl-substituted $C_5$–$C_8$cycloalkyl; $C_7$–$C_9$phenylalkyl or phenyl, $R_4$ is hydrogen or methyl, $R_5$ is $C_1$–$C_{18}$alkyl; $C_2$–$C_{18}$alkyl which is interrupted by oxygen, sulfur or

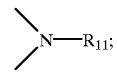

$C_2$–$C_{18}$alkenyl; $C_8$–$C_{18}$phenylalkenyl which is unsubstituted or substituted at the phenyl ring by halogen, $C_1$–$C_4$alkyl, $C_1$–$C_4$alkoxy or $C_1$–$C_4$alkylthio; $C_5$–$C_8$cycloalkyl; $C_8$–$C_{18}$phenylalkyl which is unsubstituted or substituted at the phenyl ring by halogen, $C_1$–$C_4$alkyl, $C_1$–$C_4$alkoxy or $C_1$–$C_4$alkylthio; phenyl which is unsubstituted or substituted by halogen, $C_1$–$C_4$alkyl, $C_1$–$C_4$alkoxy or $C_1$–$C_4$alkylthio;

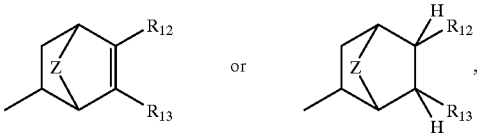

$R_6$ is $C_1$–$C_{18}$alkyl; $C_2$–$C_{18}$alkyl which is interrupted by oxygen, sulfur or

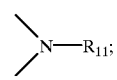

$C_2$–$C_{18}$alkenyl, $C_5$–$C_8$cycloalkyl, $C_7$–$C_9$phenylalkyl or phenyl, $R_7$ is $C_1$–$C_{18}$alkyl; $C_2$–$C_{18}$alkyl which is interrupted by oxygen, sulfur or

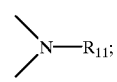

$C_2$–$C_{18}$alkenyl, $C_8$–$C_{18}$phenylalkenyl, $C_5$–$C_8$cycloalkyl, $C_9$–$C_{18}$phenylalkyl or phenyl, $R_8$ is $C_1$–$C_{18}$alkyl, $R_9$ and $R_{10}$ are each independently of the other hydrogen, $C_1$–$C_{18}$alkyl or phenyl, or $R_9$ and $R_{10}$, together with the linking carbon atom, are a $C_5$–$C_8$cycloalkylidene ring;

$R_{11}$ is hydrogen or $C_1$–$C_{12}$alkyl, $R_{12}$ is hydrogen or $C_1$–$C_4$alkyl, $R_{13}$ is hydrogen or $C_1$–$C_4$alkyl, Z is oxygen, methylene or ethylidene, and n is 1 or 2.

Other preferred powder coating compositions are those comprising as component (b) at least one compound of formula I, wherein $X_1$ is $C_2$–$C_{12}$alkylene; $C_2$–$C_{12}$alkylene which is interrupted by oxygen; $C_2$–$C_{12}$alkenylene or phenylene, $X_2$ is $C_1$–$C_{12}$alkylene; $C_2$–$C_{12}$alkylene which is interrupted by oxygen; $C_2$–$C_{12}$alkenylene, $C_2$–$C_8$alkylidene or phenylene, $X_3$ is $C_1$–$C_{12}$alkylene, Y is a direct bond, $C_1$–$C_{18}$alkylene; $C_2$–$C_{18}$alkylene which is interrupted by oxygen; $C_2$–$C_{12}$alkenylene, cyclohexylene or phenylene, $R_2$ and $R_3$ are each independently of the other $C_1$–$C_{12}$alkyl, unsubstituted or methyl-substituted cyclohexyl; $C_7$–$C_9$phenylalkyl or phenyl, $R_4$ is hydrogen or methyl, $R_5$ is $C_1$–$C_{18}$alkyl; $C_2$–$C_{12}$alkyl is interrupted by oxygen; $C_2$–$C_{14}$alkenyl; $C_8$–$C_{14}$phenylalkenyl which is unsubstituted or substituted at the phenyl ring by chloro, methyl or methoxy; cyclohexyl; $C_8$–$C_{14}$phenylalkyl which is unsubstituted or substituted at the phenyl ring by chloro, methyl or methoxy; phenyl which is unsubstituted or substituted by chloro, methyl or methoxy;

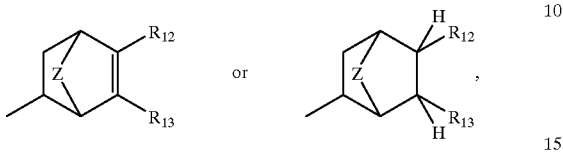

$R_6$ is $C_1$–$C_{12}$alkyl; $C_2$–$C_{12}$alkyl which is interrupted by oxygen; or $C_5$–$C_8$cycloalkyl, $R_7$ is $C_1$–$C_{12}$alkyl; $C_2$–$C_{12}$alkyl which is interrupted by oxygen; or phenyl, $R_8$ is $C_1$–$C_{12}$alkyl, $R_9$ and $R_{10}$ are each independently of the other hydrogen, $C_1$–$C_{12}$alkyl or phenyl, or $R_9$ and $R_{10}$, together with the linking carbon atom, are a cyclohexylidene ring;

$R_{12}$ is hydrogen or methyl, $R_{13}$ is hydrogen or methyl,

Z is oxygen or methylene, and n is 1 or 2.

Particularly preferred powder coating compositions are those comprising as component (b) at least one compound of formula I, wherein $X_1$ is ethylene or $C_2$–$C_3$alkenylene, $X_2$ is methylene or ethylidene, $X_3$ is ethylene, Y is a direct bond, $C_1$–$C_{12}$alkylene, $C_2$–$C_4$alkenylene, cyclohexylene or phenylene, $R_2$ is $C_1$–$C_5$alkyl, $R_3$ is $C_1$–$C_5$alkyl, $R_4$ is hydrogen or methyl, $R_5$ is $C_1$–$C_{12}$alkyl; $C_4$–$C_8$alkyl which is interrupted by oxygen; $C_2$–$C_{10}$alkenyl; $C_8$–$C_{10}$phenylalkenyl which is unsubstituted or substituted at the phenyl ring by methoxy; cyclohexyl, unsubstituted or chloro- or methoxy-substituted phenyl;

$R_6$ is $C_1$–$C_8$alkyl or cyclohexyl, $R_7$ is $C_1$–$C_4$alkyl, $R_8$ is $C_1$–$C_4$alkyl, $R_9$ is hydrogen, $R_{10}$ is hydrogen or methyl, $R_{12}$ is hydrogen or methyl, $R_{13}$ is hydrogen or methyl, Z is oxygen or methylene, and n is 1 or 2.

Very particularly preferred powder coating compositions are those comprising as component (b) at least one of the compounds of formula Ia, Ib, Ic, Id, Ie, If, Ig, Ih, Ii, Ij, Ik, Im, In, Io, Ip, Iq or Ir

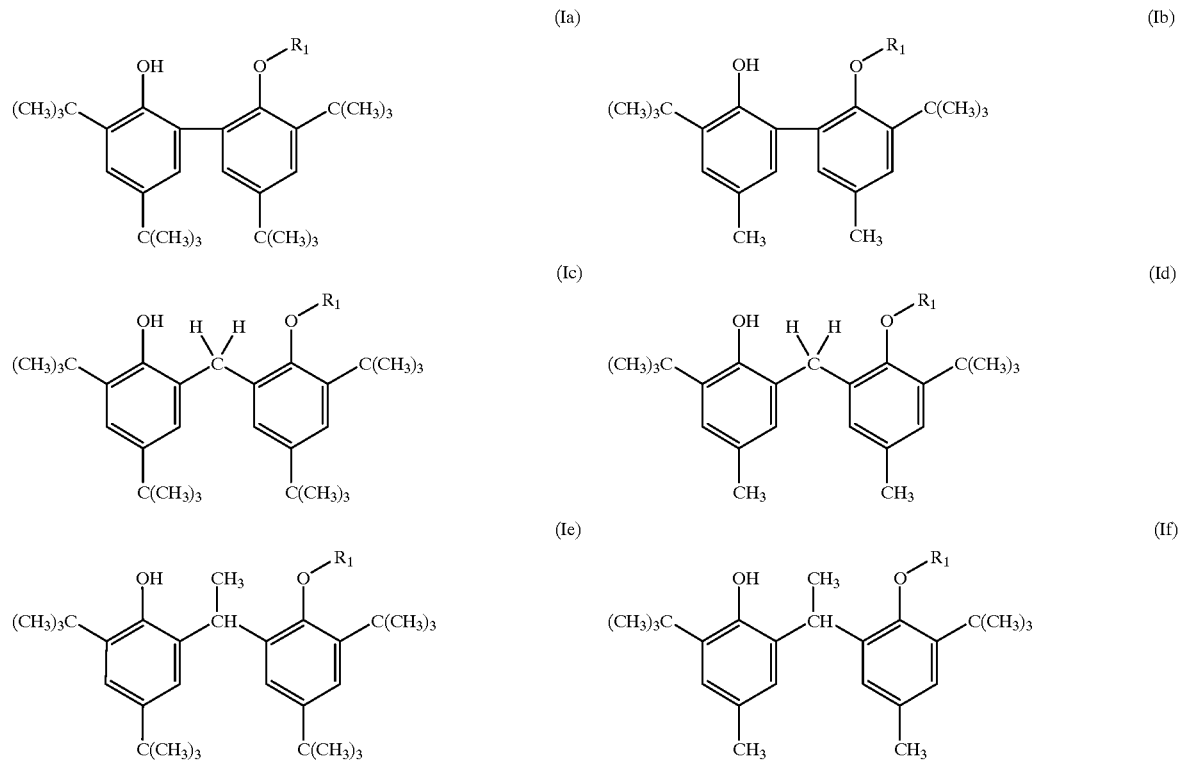

-continued
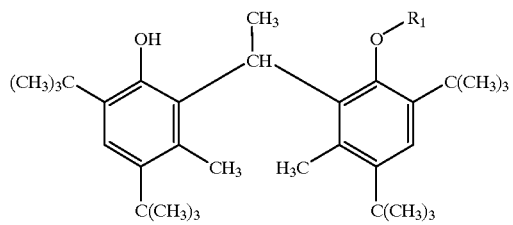
(Ig)
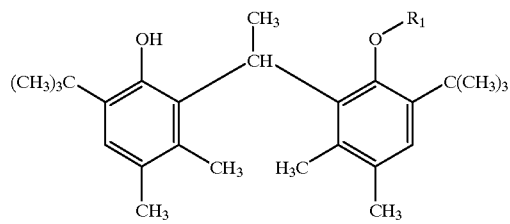
(Ih)
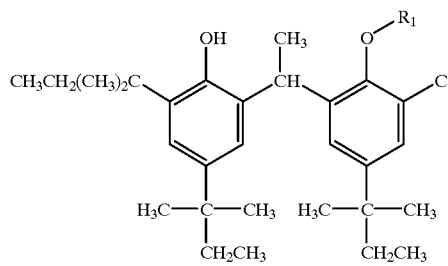
(Ii)
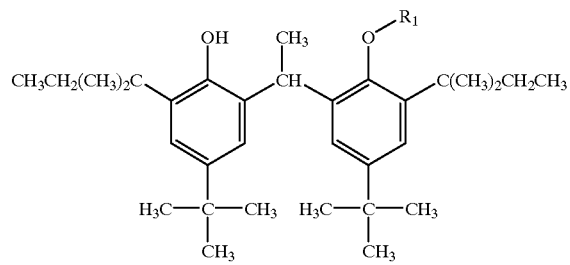
(Ij)
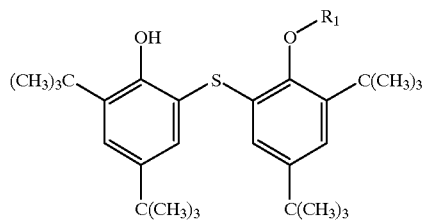
(Ik)
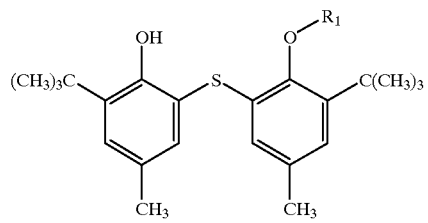
(Im)
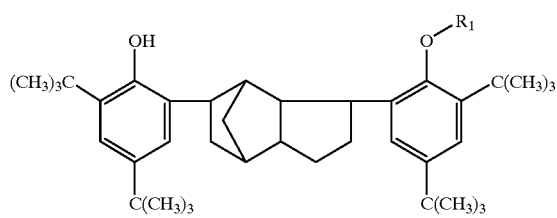
(In)
(Io)
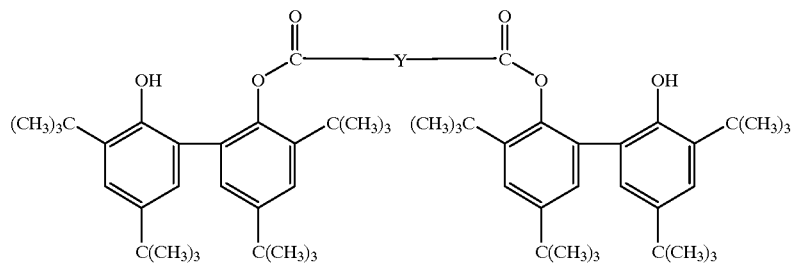
(Ip)
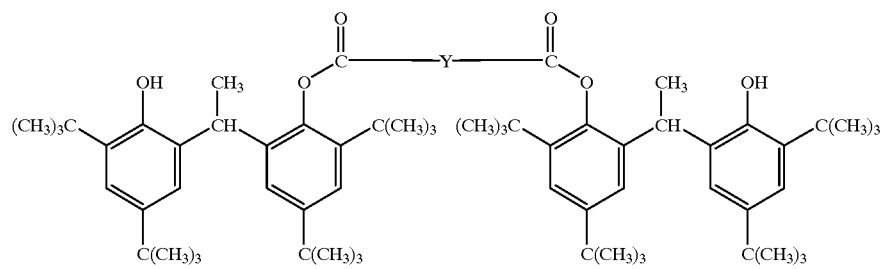
(Iq)

TABLE 1

Compounds of formula Ia

| No. | $R_1$ |
|---|---|
| 101 | H |
| 102 | $CH_3CO-$ |
| 103 | $CH_3CH_2CO-$ |
| 104 | $CH_3(CH_2)_2CO-$ |
| 105 | $CH_3(CH_2)_3CO-$ |
| 106 | $CH_3(CH_2)_4CO-$ |
| 107 | $CH_3(CH_2)_5CO-$ |
| 108 | $CH_3(CH_2)_6CO-$ |
| 109 | $CH_3(CH_2)_7CO-$ |
| 110 | $CH_3(CH_2)_8CO-$ |
| 111 | $CH_3(CH_2)_9CO-$ |
| 112 | $CH_3(CH_2)_{10}CO-$ |
| 113 | $CH_3(CH_2)_3CH(CH_2CH_3)CO-$ |
| 114 | $CH_2=CH-CO-$ |
| 115 | $CH_3CH=CH-CO-$ |
| 116 | $CH_2=CH(CH_2)_8CO-$ |
| 117 | phenyl-CH=CH—CO— |
| 118 | p-methoxyphenyl-CH=CH—CO— |
| 119 | o-chlorophenyl-CO— |
| 120 | p-methoxyphenyl-CO— |
| 121 | cyclohexyl-CO— |
| 122 | [bicyclic structure with C(=O)–] |
| 123 | [bicyclic structure with double bond and C(=O)–] |
| 124 | [H₃C-substituted bicyclic structure with C(=O)–] |
| 125 | [oxa-bicyclic structure with C(=O)–] |
| 126 | $CH_3(CH_2)_3O(CH_2)_2CO-$ |
| 127 | $CH_3(CH_2)_3O(CH_2)_2O(CH_2)_2CO-$ |
| 128 | cyclohexyl-$O_2CCH_2CH_2CO-$ |
| 129 | $CH_3O_2C-CH=CH-CO-$ |
| 130 | $CH_3CH_2O_2C-CH=CH-CO-$ |
| 131 | $CH_3(CH_2)_2O_2C-CH=CH-CO-$ |
| 132 | $CH_3(CH_2)_3O_2C-CH=CH-CO-$ |
| 133 | $CH_3O_2CCH_2C(=CH_2)CO-$ |
| 134 | cyclohexyl$O_2CCH_2C(=CH_2)CO-$ |

TABLE 2

Compounds of formula Ib

| No. | $R_1$ |
|---|---|
| 135 | H |
| 136 | $CH_3CO-$ |
| 137 | $CH_3CH_2CO-$ |
| 138 | $CH_3(CH_2)_2CO-$ |
| 139 | $CH_3(CH_2)_3CO-$ |
| 140 | $CH_3(CH_2)_4CO-$ |
| 141 | $CH_3(CH_2)_5CO-$ |
| 142 | $CH_3(CH_2)_6CO-$ |
| 143 | $CH_3(CH_2)_7CO-$ |
| 144 | $CH_3(CH_2)_8CO-$ |
| 145 | $CH_3(CH_2)_9CO-$ |
| 146 | $CH_3(CH_2)_{13}CO-$ |
| 147 | $CH_3(CH_2)_3CH(CH_2CH_3)CO-$ |
| 148 | $CH_2=CH-CO-$ |
| 149 | $CH_3CH=CH-CO-$ |
| 150 | $CH_2=CH(CH_2)_8CO-$ |
| 151 | phenyl-CH=CH—CO— |
| 152 | p-methoxyphenyl-CH=CH—CO— |
| 153 | o-chlorophenyl-CO— |
| 154 | p-methoxyphenyl-CO— |
| 155 | cyclohexyl-CO— |
| 156 | [bicyclic structure with C(=O)–] |
| 157 | [bicyclic structure with double bond and C(=O)–] |
| 158 | [H₃C-substituted bicyclic structure with C(=O)–] |
| 159 | [oxa-bicyclic structure with C(=O)–] |
| 160 | $CH_3(CH_2)_3O(CH_2)_2CO-$ |
| 161 | $CH_3(CH_2)_3O(CH_2)_2O(CH_2)_2CO-$ |
| 162 | cyclohexyl-$O_2CCH_2CH_2CO-$ |
| 163 | $CH_3O_2C-CH=CH-CO-$ |
| 164 | $CH_3CH_2O_2C-CH=CH-CO-$ |
| 165 | $CH_3(CH_2)_2O_2C-CH=CH-CO-$ |
| 166 | $CH_3(CH_2)_3O_2C-CH=CH-CO-$ |
| 167 | $CH_3O_2CCH_2C(=CH_2)CO-$ |
| 168 | cyclohexyl$O_2CCH_2C(=CH_2)CO-$ |

TABLE 3

Compounds of formula Ic

| No. | $R_1$ |
|---|---|
| 169 | H |
| 170 | $CH_3CO-$ |
| 171 | $CH_3CH_2CO-$ |
| 172 | $CH_3(CH_2)_2CO-$ |
| 173 | $CH_3(CH_2)_3CO-$ |
| 174 | $CH_3(CH_2)_4CO-$ |
| 175 | $CH_3(CH_2)_5CO-$ |
| 176 | $CH_3(CH_2)_6CO-$ |
| 177 | $CH_3(CH_2)_7CO-$ |
| 178 | $CH_3(CH_2)_8CO-$ |
| 179 | $CH_3(CH_2)_9CO-$ |
| 180 | $CH_3(CH_2)_{13}CO-$ |
| 181 | $CH_3(CH_2)_3CH(CH_2CH_3)CO-$ |
| 182 | $CH_2=CH-CO-$ |
| 183 | $CH_3CH=CH-CO-$ |
| 184 | $CH_2=CH(CH_2)_8CO-$ |
| 185 | phenyl-CH=CH—CO— |
| 186 | p-methoxyphenyl-CH=CH—CO— |
| 187 | o-chlorophenyl-CO— |
| 188 | p-methoxyphenyl-CO— |
| 189 | cyclohexyl-CO— |

TABLE 3-continued

Compounds of formula Ic

| No. | R$_1$ |
|---|---|
| 190 | 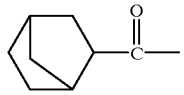 |
| 191 | 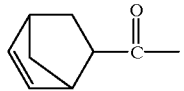 |
| 192 |  |
| 193 | 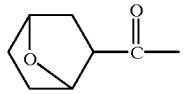 |
| 194 | CH$_3$(CH$_2$)$_3$O(CH$_2$)$_2$CO— |
| 195 | CH$_3$(CH$_2$)$_3$O(CH$_2$)$_2$O(CH$_2$)$_2$CO— |
| 196 | cyclohexyl-O$_2$CCH$_2$CH$_2$CO— |
| 197 | CH$_3$O$_2$C—CH=CH—CO— |
| 198 | CH$_3$CH$_2$O$_2$C—CH=CH—CO— |
| 199 | CH$_3$(CH$_2$)$_2$O$_2$C—CH=CH—CO— |
| 200 | CH$_3$(CH$_2$)$_3$O$_2$C—CH=CH—CO— |
| 201 | CH$_3$O$_2$CCH$_2$C(=CH$_2$)CO— |
| 202 | cyclohexylO$_2$CCH$_2$C(=CH$_2$)CO— |

TABLE 4

Compounds of formula Id

| No. | R$_1$ |
|---|---|
| 203 | H |
| 204 | CH$_3$CO— |
| 205 | CH$_3$CH$_2$CO— |
| 206 | CH$_3$(CH$_2$)$_2$CO— |
| 207 | CH$_3$(CH$_2$)$_3$CO— |
| 208 | CH$_3$(CH$_2$)$_4$CO— |
| 209 | CH$_3$(CH$_2$)$_5$CO— |
| 210 | CH$_3$(CH$_2$)$_6$CO— |
| 211 | CH$_3$(CH$_2$)$_7$CO— |
| 212 | CH$_3$(CH$_2$)$_8$CO— |
| 213 | CH$_3$(CH$_2$)$_9$CO— |
| 214 | CH$_3$(CH$_2$)$_{13}$CO— |
| 215 | CH$_3$(CH$_2$)$_3$CH(CH$_2$CH$_3$)CO— |
| 216 | CH$_2$=CH—CO— |
| 217 | CH$_3$CH=CH—CO— |
| 218 | CH$_2$=CH(CH$_2$)$_8$CO— |
| 219 | phenyl-CH=CH—CO— |
| 220 | p-methoxyphenyl-CH=CH—CO— |
| 221 | o-chlorophenyl-CO— |
| 222 | p-methoxyphenyl-CO— |
| 223 | cyclohexyl-CO— |
| 224 | 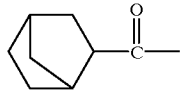 |
| 225 | 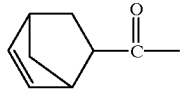 |

TABLE 4-continued

Compounds of formula Id

| No. | R$_1$ |
|---|---|
| 226 |  |
| 227 | 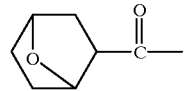 |
| 228 | CH$_3$(CH$_2$)$_3$O(CH$_2$)$_2$CO— |
| 229 | CH$_3$(CH$_2$)$_3$O(CH$_2$)$_2$O(CH$_2$)$_2$CO— |
| 230 | cyclohexyl-O$_2$CCH$_2$CH$_2$CO— |
| 231 | CH$_3$O$_2$C—CH=CH—CO— |
| 232 | CH$_3$CH$_2$O$_2$C—CH=CH—CO— |
| 233 | CH$_3$(CH$_2$)$_2$O$_2$C—CH=CH—CO— |
| 234 | CH$_3$(CH$_2$)$_3$O$_2$C—CH=CH—CO— |
| 235 | CH$_3$O$_2$CCH$_2$C(=CH$_2$)CO— |
| 236 | cyclohexylO$_2$CCH$_2$C(=CH$_2$)CO— |

TABLE 5

Compounds of formula Ie

| No. | R$_1$ |
|---|---|
| 237 | H |
| 238 | CH$_3$CO— |
| 239 | CH$_3$CH$_2$CO— |
| 240 | CH$_3$(CH$_2$)$_2$CO— |
| 241 | CH$_3$(CH$_2$)$_3$CO— |
| 242 | CH$_3$(CH$_2$)$_4$CO— |
| 243 | CH$_3$(CH$_2$)$_5$CO— |
| 244 | CH$_3$(CH$_2$)$_6$CO— |
| 245 | CH$_3$(CH$_2$)$_7$CO— |
| 246 | CH$_3$(CH$_2$)$_8$CO— |
| 247 | CH$_3$(CH$_2$)$_9$CO— |
| 248 | CH$_3$(CH$_2$)$_{13}$CO— |
| 249 | CH$_3$(CH$_2$)$_3$CH(CH$_2$CH$_3$)CO— |
| 250 | CH$_2$=CH—CO— |
| 251 | CH$_3$CH=CH—CO— |
| 252 | CH$_2$=CH(CH$_2$)$_8$CO— |
| 253 | phenyl-CH=CH—CO— |
| 254 | p-methoxyphenyl-CH=CH—CO— |
| 255 | o-chlorophenyl-CO— |
| 256 | p-methoxyphenyl-CO— |
| 257 | cyclohexyl-CO— |
| 258 | 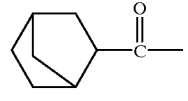 |
| 259 | 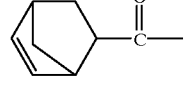 |
| 260 |  |
| 261 | 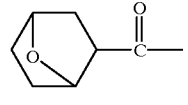 |

TABLE 5-continued

Compounds of formula Ie

| No. | $R_1$ |
|---|---|
| 262 | $CH_3(CH_2)_3O(CH_2)_2CO-$ |
| 263 | $CH_3(CH_2)_3O(CH_2)_2O(CH_2)_2CO-$ |
| 264 | cyclohexyl-$O_2CCH_2CH_2CO-$ |
| 265 | $CH_3O_2C-CH=CH-CO-$ |
| 266 | $CH_3CH_2O_2C-CH=CH-CO-$ |
| 267 | $CH_3(CH_2)_2O_2C-CH=CH-CO-$ |
| 268 | $CH_3(CH_2)_3O_2C-CH=CH-CO-$ |
| 269 | $CH_3O_2CCH_2C(=CH_2)CO-$ |
| 270 | cyclohexyl$O_2CCH_2C(=CH_2)CO-$ |

TABLE 6

Compounds of formula If

| No. | $R_1$ |
|---|---|
| 271 | H |
| 272 | $CH_3CO-$ |
| 273 | $CH_3CH_2CO-$ |
| 274 | $CH_3(CH_2)_2CO-$ |
| 275 | $CH_3(CH_2)_3CO-$ |
| 276 | $CH_3(CH_2)_4CO-$ |
| 277 | $CH_3(CH_2)_5CO-$ |
| 278 | $CH_3(CH_2)_6CO-$ |
| 279 | $CH_3(CH_2)_7CO-$ |
| 280 | $CH_3(CH_2)_8CO-$ |
| 281 | $CH_3(CH_2)_9CO-$ |
| 282 | $CH_3(CH_2)_{13}CO-$ |
| 283 | $CH_3(CH_2)_3CH(CH_2CH_3)CO-$ |
| 284 | $CH_2=CH-CO-$ |
| 285 | $CH_3CH=CH-CO-$ |
| 286 | $CH_2=CH(CH_2)_8CO-$ |
| 287 | phenyl-$CH=CH-CO-$ |
| 288 | p-methoxyphenyl-$CH=CH-CO-$ |
| 289 | o-chlorophenyl-$CO-$ |
| 290 | p-methoxyphenyl-$CO-$ |
| 291 | cyclohexyl-$CO-$ |
| 292 | (norbornyl-CO—) |
| 293 | (norbornenyl-CO—) |
| 294 | ($H_3C$-methylnorbornenyl-CO—) |
| 295 | (oxabicyclic-CO—) |
| 296 | $CH_3(CH_2)_3O(CH_2)_2CO-$ |
| 297 | $CH_3(CH_2)_3O(CH_2)_2O(CH_2)_2CO-$ |
| 298 | cyclohexyl-$O_2CCH_2CH_2CO-$ |
| 299 | $CH_3O_2C-CH=CH-CO-$ |
| 300 | $CH_3CH_2O_2C-CH=CH-CO-$ |
| 301 | $CH_3(CH_2)_2O_2C-CH=CH-CO-$ |
| 302 | $CH_3(CH_2)_3O_2C-CH=CH-CO-$ |
| 303 | $CH_3O_2CCH_2C(=CH_2)CO-$ |
| 304 | cyclohexyl$O_2CCH_2C(=CH_2)CO-$ |

TABLE 7

Compounds of formula Ig

| No. | $R_1$ |
|---|---|
| 305 | H |
| 306 | $CH_3CO-$ |
| 307 | $CH_3CH_2CO-$ |
| 308 | $CH_3(CH_2)_2CO-$ |
| 309 | $CH_3(CH_2)_3CO-$ |
| 310 | $CH_3(CH_2)_4CO-$ |
| 311 | $CH_3(CH_2)_5CO-$ |
| 312 | $CH_3(CH_2)_6CO-$ |
| 313 | $CH_3(CH_2)_7CO-$ |
| 314 | $CH_3(CH_2)_8CO-$ |
| 315 | $CH_3(CH_2)_9CO-$ |
| 316 | $CH_3(CH_2)_{13}CO-$ |
| 317 | $CH_3(CH_2)_3CH(CH_2CH_3)CO-$ |
| 318 | $CH_2=CH-CO-$ |
| 319 | $CH_3CH=CH-CO-$ |
| 320 | $CH_2=CH(CH_2)_8CO-$ |
| 321 | phenyl-$CH=CH-CO-$ |
| 322 | p-methoxyphenyl-$CH=CH-CO-$ |
| 323 | o-chlorophenyl-$CO-$ |
| 324 | p-methoxyphenyl-$CO-$ |
| 325 | cyclohexyl-$CO-$ |
| 326 | (norbornyl-CO—) |
| 327 | (norbornenyl-CO—) |
| 328 | ($H_3C$-methylnorbornenyl-CO—) |
| 329 | (oxabicyclic-CO—) |
| 330 | $CH_3(CH_2)_3O(CH_2)_2CO-$ |
| 331 | $CH_3(CH_2)_3O(CH_2)_2O(CH_2)_2CO-$ |
| 332 | cyclohexyl-$O_2CCH_2CH_2CO-$ |
| 333 | $CH_3O_2C-CH=CH-CO-$ |
| 334 | $CH_3CH_2O_2C-CH=CH-CO-$ |
| 335 | $CH_3(CH_2)_2O_2C-CH=CH-CO-$ |
| 336 | $CH_3(CH_2)_3O_2C-CH=CH-CO-$ |
| 337 | $CH_3O_2CCH_2C(=CH_2)CO-$ |
| 338 | cyclohexyl$O_2CCH_2C(=CH_2)CO-$ |

TABLE 8

Compounds of formula Ih

| No. | $R_1$ |
|---|---|
| 339 | H |
| 340 | $CH_3CO-$ |
| 341 | $CH_3CH_2CO-$ |
| 342 | $CH_3(CH_2)_2CO-$ |
| 343 | $CH_3(CH_2)_3CO-$ |
| 344 | $CH_3(CH_2)_4CO-$ |
| 345 | $CH_3(CH_2)_5CO-$ |
| 346 | $CH_3(CH_2)_6CO-$ |
| 347 | $CH_3(CH_2)_7CO-$ |
| 348 | $CH_3(CH_2)_8CO-$ |
| 349 | $CH_3(CH_2)_9CO-$ |

TABLE 8-continued

Compounds of formula Ih

| No. | R₁ |
|---|---|
| 350 | $CH_3(CH_2)_{13}CO-$ |
| 351 | $CH_3(CH_2)_3CH(CH_2CH_3)CO-$ |
| 352 | $CH_2=CH-CO-$ |
| 353 | $CH_3CH=CH-CO-$ |
| 354 | $CH_2=CH(CH_2)_8CO-$ |
| 355 | phenyl-CH=CH-CO- |
| 356 | p-methoxyphenyl-CH=CH-CO- |
| 357 | o-chlorophenyl-CO- |
| 358 | p-methoxyphenyl-CO- |
| 359 | cyclohexyl-CO- |
| 360 | (norbornyl-CO-) |
| 361 | (norbornenyl-CO-) |
| 362 | (methyl-norbornenyl-CO-) |
| 363 | (oxa-norbornyl-CO-) |
| 364 | $CH_3(CH_2)_3O(CH_2)_2CO-$ |
| 365 | $CH_3(CH_2)_3O(CH_2)_2O(CH_2)_2CO-$ |
| 366 | $cyclohexyl-O_2CCH_2CH_2CO-$ |
| 367 | $CH_3O_2C-CH=CH-CO-$ |
| 368 | $CH_3CH_2O_2C-CH=CH-CO-$ |
| 369 | $CH_3(CH_2)_2O_2C-CH=CH-CO-$ |
| 370 | $CH_3(CH_2)_3O_2C-CH=CH-CO-$ |
| 371 | $CH_3O_2CCH_2C(=CH_2)CO-$ |
| 372 | $cyclohexylO_2CCH_2C(=CH_2)CO-$ |

TABLE 9

Compounds of formula Ii

| No. | R₁ |
|---|---|
| 373 | H |
| 374 | $CH_3CO-$ |
| 375 | $CH_3CH_2CO-$ |
| 376 | $CH_3(CH_2)_2CO-$ |
| 377 | $CH_3(CH_2)_3CO-$ |
| 378 | $CH_3(CH_2)_4CO-$ |
| 379 | $CH_3(CH_2)_5CO-$ |
| 380 | $CH_3(CH_2)_6CO-$ |
| 381 | $CH_3(CH_2)_7CO-$ |
| 382 | $CH_3(CH_2)_8CO-$ |
| 383 | $CH_3(CH_2)_9CO-$ |
| 384 | $CH_3(CH_2)_{13}CO-$ |
| 385 | $CH_3(CH_2)_3CH(CH_2CH_3)CO-$ |
| 386 | $CH_2=CH-CO-$ |
| 387 | $CH_3CH=CH-CO-$ |
| 388 | $CH_2=CH(CH_2)_8CO-$ |
| 389 | phenyl-CH=CH-CO- |
| 390 | p-methoxyphenyl-CH=CH-CO- |
| 391 | o-chlorophenyl-CO- |
| 392 | p-methoxyphenyl-CO- |
| 393 | cyclohexyl-CO- |

TABLE 9-continued

Compounds of formula Ii

| No. | R₁ |
|---|---|
| 394 | (norbornyl-CO-) |
| 395 | (norbornenyl-CO-) |
| 396 | (methyl-norbornenyl-CO-) |
| 397 | (oxa-norbornyl-CO-) |
| 398 | $CH_3(CH_2)_3O(CH_2)_2CO-$ |
| 399 | $CH_3(CH_2)_3O(CH_2)_2O(CH_2)_2CO-$ |
| 400 | $cyclohexyl-O_2CCH_2CH_2CO-$ |
| 401 | $CH_3O_2C-CH=CH-CO-$ |
| 402 | $CH_3CH_2O_2C-CH=CH-CO-$ |
| 403 | $CH_3(CH_2)_2O_2C-CH=CH-CO-$ |
| 404 | $CH_3(CH_2)_3O_2C-CH=CH-CO-$ |
| 405 | $CH_3O_2CCH_2C(=CH_2)CO-$ |
| 406 | $cyclohexylO_2CCH_2C(=CH_2)CO-$ |

TABLE 10

Compounds of formula Ij

| No. | R₁ |
|---|---|
| 407 | H |
| 408 | $CH_3CO-$ |
| 409 | $CH_3CH_2CO-$ |
| 410 | $CH_3(CH_2)_2CO-$ |
| 411 | $CH_3(CH_2)_3CO-$ |
| 412 | $CH_3(CH_2)_4CO-$ |
| 413 | $CH_3(CH_2)_5CO-$ |
| 414 | $CH_3(CH_2)_6CO-$ |
| 415 | $CH_3(CH_2)_7CO-$ |
| 416 | $CH_3(CH_2)_8CO-$ |
| 417 | $CH_3(CH_2)_9CO-$ |
| 418 | $CH_3(CH_2)_{13}CO-$ |
| 419 | $CH_3(CH_2)_3CH(CH_2CH_3)CO-$ |
| 420 | $CH_2=CH-CO-$ |
| 421 | $CH_3CH=CH-CO-$ |
| 422 | $CH_2=CH(CH_2)_8CO-$ |
| 423 | phenyl-CH=CH-CO- |
| 424 | p-methoxyphenyl-CH=CH-CO- |
| 425 | o-chlorophenyl-CO- |
| 426 | p-methoxyphenyl-CO- |
| 427 | cyclohexyl-CO- |
| 428 | (norbornyl-CO-) |
| 429 | (norbornenyl-CO-) |

TABLE 10-continued

Compounds of formula Ij

| No. | R$_1$ |
|---|---|
| 430 | (methyl-bicycloheptenyl)-CO— |
| 431 | (oxabicycloheptyl)-CO— |
| 432 | CH$_3$(CH$_2$)$_3$O(CH$_2$)$_2$CO— |
| 433 | CH$_3$(CH$_2$)$_3$O(CH$_2$)$_2$O(CH$_2$)$_2$CO— |
| 434 | cyclohexyl-O$_2$CCH$_2$CH$_2$CO— |
| 435 | CH$_3$O$_2$C—CH=CH—CO— |
| 436 | CH$_3$CH$_2$O$_2$C—CH=CH—CO— |
| 437 | CH$_3$(CH$_2$)$_2$O$_2$C—CH=CH—CO— |
| 438 | CH$_3$(CH$_2$)$_3$O$_2$C—CH=CH—CO— |
| 439 | CH$_3$O$_2$CCH$_2$C(=CH$_2$)CO— |
| 440 | cyclohexylO$_2$CCH$_2$C(=CH$_2$)CO— |

TABLE 10

Compounds of formula Ik

| No. | R$_1$ |
|---|---|
| 441 | H |
| 442 | CH$_3$CO— |
| 443 | CH$_3$CH$_2$CO— |
| 444 | CH$_3$(CH$_2$)$_2$CO— |
| 445 | CH$_3$(CH$_2$)$_3$CO— |
| 446 | CH$_3$(CH$_2$)$_4$CO— |
| 447 | CH$_3$(CH$_2$)$_5$CO— |
| 448 | CH$_3$(CH$_2$)$_6$CO— |
| 449 | CH$_3$(CH$_2$)$_7$CO— |
| 450 | CH$_3$(CH$_2$)$_8$CO— |
| 451 | CH$_3$(CH$_2$)$_9$CO— |
| 452 | CH$_3$(CH$_2$)$_{13}$CO— |
| 453 | CH$_3$(CH$_2$)$_3$CH(CH$_2$CH$_3$)CO— |
| 454 | CH$_2$=CH—CO— |
| 455 | CH$_3$CH=CH—CO— |
| 456 | CH$_2$=CH(CH$_2$)$_8$CO— |
| 457 | phenyl-CH=CH—CO— |
| 458 | p-methoxyphenyl-CH=CH—CO— |
| 459 | o-chlorophenyl-CO— |
| 460 | p-methoxyphenyl-CO— |
| 461 | cyclohexyl-CO— |
| 462 | (bicycloheptyl)-CO— |
| 463 | (bicycloheptenyl)-CO— |
| 464 | (methyl-bicycloheptenyl)-CO— |
| 465 | (oxabicycloheptyl)-CO— |

TABLE 10-continued

Compounds of formula Ik

| No. | R$_1$ |
|---|---|
| 466 | CH$_3$(CH$_2$)$_3$O(CH$_2$)$_2$CO— |
| 467 | CH$_3$(CH$_2$)$_3$O(CH$_2$)$_2$O(CH$_2$)$_2$CO— |
| 468 | cyclohexyl-O$_2$CCH$_2$CH$_2$CO— |
| 469 | CH$_3$O$_2$C—CH=CH—CO— |
| 470 | CH$_3$CH$_2$O$_2$C—CH=CH—CO— |
| 471 | CH$_3$(CH$_2$)$_2$O$_2$C—CH=CH—CO— |
| 472 | CH$_3$(CH$_2$)$_3$O$_2$C—CH=CH—CO— |
| 473 | CH$_3$O$_2$CCH$_2$C(=CH$_2$)CO— |
| 474 | cyclohexylO$_2$CCH$_2$C(=CH$_2$)CO— |

TABLE 11

Compounds of formula Im

| No. | R$_1$ |
|---|---|
| 475 | H |
| 476 | CH$_3$CO— |
| 477 | CH$_3$CH$_2$CO— |
| 478 | CH$_3$(CH$_2$)$_2$CO— |
| 479 | CH$_3$(CH$_2$)$_3$CO— |
| 480 | CH$_3$(CH$_2$)$_4$CO— |
| 481 | CH$_3$(CH$_2$)$_5$CO— |
| 482 | CH$_3$(CH$_2$)$_6$CO— |
| 483 | CH$_3$(CH$_2$)$_7$CO— |
| 484 | CH$_3$(CH$_2$)$_8$CO— |
| 485 | CH$_3$(CH$_2$)$_9$CO— |
| 486 | CH$_3$(CH$_2$)$_{13}$CO— |
| 487 | CH$_3$(CH$_2$)$_3$CH(CH$_2$CH$_3$)CO— |
| 488 | CH$_2$=CH—CO— |
| 489 | CH$_3$CH=CH—CO— |
| 490 | CH$_2$=CH(CH$_2$)$_8$CO— |
| 491 | phenyl-CH=CH—CO— |
| 492 | p-methoxyphenyl-CH=CH—CO— |
| 493 | o-chlorophenyl-CO— |
| 494 | p-methoxyphenyl-CO— |
| 495 | cyclohexyl-CO— |
| 496 | (bicycloheptyl)-CO— |
| 497 | (bicycloheptenyl)-CO— |
| 498 | (methyl-bicycloheptenyl)-CO— |
| 499 | (oxabicycloheptyl)-CO— |
| 500 | CH$_3$(CH$_2$)$_3$O(CH$_2$)$_2$CO— |
| 501 | CH$_3$(CH$_2$)$_3$O(CH$_2$)$_2$O(CH$_2$)$_2$CO— |
| 502 | cyclohexyl-O$_2$CCH$_2$CH$_2$CO— |
| 503 | CH$_3$O$_2$C—CH=CH—CO— |
| 504 | CH$_3$CH$_2$O$_2$C—CH=CH—CO— |
| 505 | CH$_3$(CH$_2$)$_2$O$_2$C—CH=CH—CO— |
| 506 | CH$_3$(CH$_2$)$_3$O$_2$C—CH=CH—CO— |
| 507 | CH$_3$O$_2$CCH$_2$C(=CH$_2$)CO— |
| 508 | cyclohexylO$_2$CCH$_2$C(=CH$_2$)CO— |

TABLE 12

Compounds of formula In

| No. | R$_1$ |
|---|---|
| 509 | H |
| 510 | CH$_3$CO— |
| 511 | CH$_3$CH$_2$CO— |
| 512 | CH$_3$(CH$_2$)$_2$CO— |
| 513 | CH$_3$(CH$_2$)$_3$CO— |
| 514 | CH$_3$(CH$_2$)$_4$CO— |
| 515 | CH$_3$(CH$_2$)$_5$CO— |
| 516 | CH$_3$(CH$_2$)$_6$CO— |
| 517 | CH$_3$(CH$_2$)$_7$CO— |
| 518 | CH$_3$(CH$_2$)$_8$CO— |
| 519 | CH$_3$(CH$_2$)$_9$CO— |
| 520 | CH$_3$(CH$_2$)$_{13}$CO— |
| 521 | CH$_3$(CH$_2$)$_3$CH(CH$_2$CH$_3$)CO— |
| 522 | CH$_2$=CH—CO— |
| 523 | CH$_3$CH=CH—CO— |
| 524 | CH$_2$=CH(CH$_2$)$_8$CO— |
| 525 | phenyl-CH=CH—CO— |
| 526 | p-methoxyphenyl-CH=CH—CO— |
| 527 | o-chlorophenyl-CO— |
| 528 | p-methoxyphenyl-CO— |
| 529 | cyclohexyl-CO— |
| 530 | (norbornyl-CO—) |
| 531 | (norbornenyl-CO—) |
| 532 | (methyl norbornenyl-CO—) |
| 533 | (oxanorbornyl-CO—) |
| 534 | CH$_3$(CH$_2$)$_3$O(CH$_2$)$_2$CO— |
| 535 | CH$_3$(CH$_2$)$_3$O(CH$_2$)$_2$O(CH$_2$)$_2$CO— |
| 536 | cyclohexyl-O$_2$CCH$_2$CH$_2$CO— |
| 537 | CH$_3$O$_2$C—CH=CH—CO— |
| 538 | CH$_3$CH$_2$O$_2$C—CH=CH—CO— |
| 539 | CH$_3$(CH$_2$)$_2$O$_2$C—CH=CH—CO— |
| 540 | CH$_3$(CH$_2$)$_3$O$_2$C—CH=CH—CO— |
| 541 | CH$_3$O$_2$CCH$_2$C(=CH$_2$)CO— |
| 542 | cyclohexylO$_2$CCH$_2$C(=CH$_2$)CO— |

TABLE 13

Compounds of formula Io

| No. | R$_1$ |
|---|---|
| 543 | H |
| 544 | CH$_3$CO— |
| 545 | CH$_3$CH$_2$CO— |
| 546 | CH$_3$(CH$_2$)$_2$CO— |
| 547 | CH$_3$(CH$_2$)$_3$CO— |
| 548 | CH$_3$(CH$_2$)$_4$CO— |
| 549 | CH$_3$(CH$_2$)$_5$CO— |
| 550 | CH$_3$(CH$_2$)$_6$CO— |
| 551 | CH$_3$(CH$_2$)$_7$CO— |
| 552 | CH$_3$(CH$_2$)$_8$CO— |
| 553 | CH$_3$(CH$_2$)$_9$CO— |

TABLE 13-continued

Compounds of formula Io

| No. | R$_1$ |
|---|---|
| 554 | CH$_3$(CH$_2$)$_{13}$CO— |
| 555 | CH$_3$(CH$_2$)$_3$CH(CH$_2$CH$_3$)CO— |
| 556 | CH$_2$=CH—CO— |
| 557 | CH$_3$CH=CH—CO— |
| 558 | CH$_2$=CH(CH$_2$)$_8$CO— |
| 559 | phenyl-CH=CH—CO— |
| 560 | p-methoxyphenyl-CH=CH—CO— |
| 561 | o-chlorophenyl-CO— |
| 562 | p-methoxyphenyl-CO— |
| 563 | cyclohexyl-CO— |
| 564 | (norbornyl-CO—) |
| 565 | (norbornenyl-CO—) |
| 566 | (methyl norbornenyl-CO—) |
| 567 | (oxanorbornyl-CO—) |
| 568 | CH$_3$(CH$_2$)$_3$O(CH$_2$)$_2$CO— |
| 569 | CH$_3$(CH$_2$)$_3$O(CH$_2$)$_2$O(CH$_2$)$_2$CO— |
| 570 | cyclohexyl-O$_2$CCH$_2$CH$_2$CO— |
| 571 | CH$_3$O$_2$C—CH=CH—CO— |
| 572 | CH$_3$CH$_2$O$_2$C—CH=CH—CO— |
| 573 | CH$_3$(CH$_2$)$_2$O$_2$C—CH=CH—CO— |
| 574 | CH$_3$(CH$_2$)$_3$O$_2$C—CH=CH—CO— |
| 575 | CH$_3$O$_2$CCH$_2$C(=CH$_2$)CO— |
| 576 | cyclohexylO$_2$CCH$_2$C(=CH$_2$)CO— |

TABLE 14

Compounds of formula Ip

| No. | Y |
|---|---|
| 577 | direct bond |
| 578 | —CH$_2$— |
| 579 | —CH$_2$CH$_2$— |
| 580 | —CH$_2$CH$_2$CH$_2$— |
| 581 | —CH$_2$(CH$_2$)$_2$CH$_2$— |
| 582 | —CH$_2$(CH$_2$)$_3$CH$_2$— |
| 583 | —CH$_2$(CH$_2$)$_4$CH$_2$— |
| 584 | —CH$_2$(CH$_2$)$_5$CH$_2$— |
| 585 | —CH$_2$(CH$_2$)$_6$CH$_2$— |
| 586 | —CH$_2$(CH$_2$)$_7$CH$_2$— |
| 587 | —CH$_2$(CH$_2$)$_8$CH$_2$— |
| 588 | (p-phenylene) |

TABLE 14-continued

Compounds of formula Ip

| No. | Y |
|---|---|
| 589 | (1,2-phenylene) |
| 590 | (1,4-cyclohexylene, H) |
| 591 | (1,2-cyclohexylene, H) |
| 592 | cis-CH=CH (H up, H down with methyls) |
| 593 | trans-CH=CH |
| 594 | —CH₂—C(=CH₂)— |

TABLE 15

Compounds of formula Iq

| No. | Y |
|---|---|
| 595 | direct bond |
| 596 | —CH₂— |
| 597 | —CH₂CH₂— |
| 598 | —CH₂CH₂CH₂— |
| 599 | —CH₂(CH₂)₂CH₂— |
| 600 | —CH₂(CH₂)₃CH₂— |
| 601 | —CH₂(CH₂)₄CH₂— |
| 602 | —CH₂(CH₂)₅CH₂— |
| 603 | —CH₂(CH₂)₆CH₂— |
| 604 | —CH₂(CH₂)₇CH₂— |
| 605 | —CH₂(CH₂)₈CH₂— |

TABLE 15-continued

Compounds of formula Iq

| No. | Y |
|---|---|
| 606 | (1,4-phenylene) |
| 607 | (1,2-phenylene) |
| 608 | (1,4-cyclohexylene, H) |
| 609 | (1,2-cyclohexylene, H) |
| 610 | cis-CH=CH |
| 611 | trans-CH=CH |
| 612 | —CH₂—C(=CH₂)— |

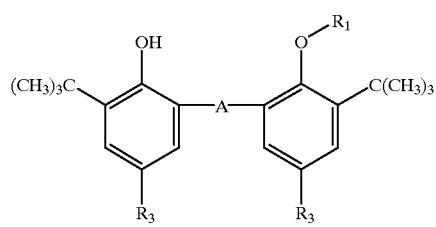

(Ir)

TABLE 16

Compounds of formula Ir

| No. | $R_1$ | $R_3$ | A |
|---|---|---|---|
| 613 | CH₃—C(=O)—O—CH(CH₃)—C(=O)— | tert-butyl | direct bond |
| 614 | CH₃—C(=O)—O—CH(CH₃)—C(=O)— | methyl | direct bond |

TABLE 16-continued

Compounds of formula Ir

| No. | R₁ | R₃ | A |
|---|---|---|---|
| 615 | CH₃—C(=O)—O—CH(CH₃)—C(=O)— | tert-butyl | —CH₂— |
| 616 | CH₃—C(=O)—O—CH(CH₃)—C(=O)— | methyl | —CH₂— |
| 617 | CH₃—C(=O)—O—CH(CH₃)—C(=O)— | tert-butyl | —CH(CH₃)— |
| 618 | CH₃—C(=O)—O—CH(CH₃)—C(=O)— | methyl | —CH(CH₃)— |
| 619 | CH₃—C(=O)—O—CH(CH₃)—C(=O)— | tert-butyl | sulfur |
| 620 | CH₃—C(=O)—O—CH(CH₃)—C(=O)— | methyl | sulfur |
| 621 | CH₃—C(=O)—O—CH(CH₃)—C(=O)— | tert-butyl | dicyclopentyl |
| 622 | CH₃—C(=O)—O—CH(CH₃)—C(=O)— | methyl | dicyclopentyl |
| 623 | (CH₃CH₂O)₂P(=O)—CH₂CH₂—C(=O)— | tert-butyl | direct bond |
| 624 | (CH₃CH₂O)₂P(=O)—CH₂CH₂—C(=O)— | methyl | direct bond |
| 625 | (CH₃CH₂O)₂P(=O)—CH₂CH₂—C(=O)— | tert-butyl | —CH₂— |
| 626 | (CH₃CH₂O)₂P(=O)—CH₂CH₂—C(=O)— | methyl | —CH₂— |
| 627 | (CH₃CH₂O)₂P(=O)—CH₂CH₂—C(=O)— | tert-butyl | —CH(CH₃)— |
| 628 | (CH₃CH₂O)₂P(=O)—CH₂CH₂—C(=O)— | methyl | —CH(CH₃)— |
| 629 | (CH₃CH₂O)₂P(=O)—CH₂CH₂—C(=O)— | tert-butyl | sulfur |
| 630 | (CH₃CH₂O)₂P(=O)—CH₂CH₂—C(=O)— | methyl | sulfur |

TABLE 16-continued

Compounds of formula Ir

| No. | $R_1$ | $R_3$ | A |
|---|---|---|---|
| 630 | $(CH_3CH_2O)_2\overset{O}{\underset{\|}{P}}-CH_2CH_2-\overset{O}{\underset{\|}{C}}-$ | tert-butyl | 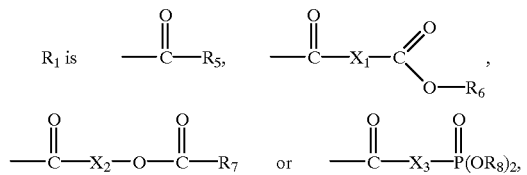 |
| 631 | $(CH_3CH_2O)_2\overset{O}{\underset{\|}{P}}-CH_2CH_2-\overset{O}{\underset{\|}{C}}-$ | methyl | 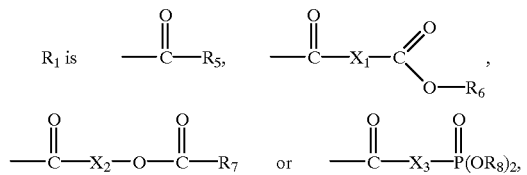 |
| 632 | $CH_3(CH_2)_7O_2C-CH=CH-CO-$ | tert-butyl | $\underset{\|}{\overset{CH_3}{-CH-}}$ |
| 633 | $CH_3(CH_2)_7O_2C-CH=CH-CO-$ | methyl | $\underset{\|}{\overset{CH_3}{-CH-}}$ |
| 634 | $CH_3-\overset{O}{\underset{\|}{C}}-O-CH_2CH_2-\overset{O}{\underset{\|}{C}}-$ | tert-butyl | $\underset{\|}{\overset{CH_3}{-CH-}}$ |

Especially interesting powder coating compositions are those, wherein component (b) is a compound of formula I, wherein
if n=1, $R_1$ is 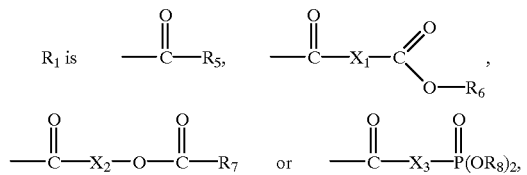

and if n=2, $R_1$ is 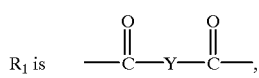,

A is a direct bond or

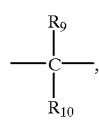

$X_1$ is ethylene or $C_2$–$C_3$alkenylene,
$X_2$ is methylene or ethylidene,
$X_3$ is ethylene,
Y is $C_6$–$C_{10}$alkylene or vinylene,
$R_2$ is tert-butyl,
$R_3$ is $C_1$–$C_4$alkyl,
$R_4$ is hydrogen,
$R_5$ is $C_1$–$C_{12}$alkyl; $C_4$–$C_8$alkyl which is interrupted by oxygen; $C_2$–$C_4$alkenyl, $C_8$–$C_{10}$phenylalkenyl or

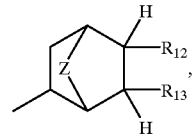

$R_6$ is $C_1$–$C_4$alkyl,
$R_7$ is $C_1$–$C_4$alkyl,
$R_8$ is $C_1$–$C_4$alkyl,
$R_9$ is hydrogen,
$R_{10}$ is hydrogen or methyl,
$R_{12}$ is hydrogen,
$R_{13}$ is hydrogen,
Z is methylene, and
n is 1 or 2.

Some of the compounds of formula I are known from the literature or can be prepared, for example, in analogy to the processes disclosed in the following literature: U.S. Pat. No. 4,365,032; EP-A-0 079 806; U.S. Pat. No. 4,562,281; U.S. Pat. No. 4,774,274; EP-A-0 500 323; U.S. Pat. No. 5,602, 196; EP-A-0 716 076; U.S. Pat. No. 5,616,780 or EP-A-0 727 410.

Interesting powder coating compositions are those, wherein the powder coating composition is a powder coating composition which is heat-curable, especially in gas furnaces.

The term gas furnaces refers to furnaces which are fed by burning hydrocarbons, such as methane, propane, butane, coal gas, carbon monoxide, hydrogen or oils. The combustion of the gases or oxidation of the gases with air gives rise, together with the nitrogen present in the air, to the nitrogen oxides which are undesirable for the curing of the powder coating composition.

This invention therefore also provides powder coating compositions which comprise components (a) and (b) and which in the course of curing are in contact with the nitrogen oxides originating from combustion gases.

The term "powder coating compositions" or "powder coatings" is understood as meaning the definition given in "Ullmann's Encyclopedia of Industrial Chemistry, 5th, Completely revised Edition, Vol. A 18", pages 438 to 444 (1991), chapter 3.4. Powder coatings are understood to be thermoplastic or stovable, crosslinkable polymers which are applied in powder form to predominantly metallic substrates. The manner in which the powder is brought into contact with the workpiece to be coated is characteristic of the different application procedures, such as electrostatic powder spraying, electrostatic fluidised-bed powder sintering, pour sintering, fluidised-bed powder sintering, rotational sintering or centrifugal sintering.

Preferred organic film-forming binders for the novel powder coating compositions are stoving systems based on e.g. epoxy resins, polyester-hydroxyalkylamides, polyester-glycolurils, epoxy-polyester resins, polyester-triglycidyl isocyanurates, hydroxy-functional polyester-blocked polyisocyanates, hydroxy-functional polyester-uretdiones, acrylate resins with hardener, or mixtures of such resins.

Film-forming binders having thermoplastic properties are also interesting, for example polyethylene, polypropylene, polyamide, polyvinyl chloride, polyvinylidene dichloride or polyvinylidene difluoride.

Polyesters are generally hydroxy- or carboxy-functional and are normally prepared by condensing diols and dicarboxylic acids. The addition of polyols and/or polyacids produces branched polyesters which then, on stoving in the presence of crosslinkers, give rise to network structures which impart the desired physical properties to the coating, such as scratch resistance, impact strength and flexural strength. Instead of multifunctional acids it is also possible to use anhydrides or acid chlorides, for example maleic anhydride, itaconic anhydride, phthalic anhydride, terephthalic anhydride, hexahydroterephthalic anhydride, trimellitic anhydride, pyromellitic dianhydride, succinic anhydride and the like. It is also possible to use simple esters, for example dimethyl terephthalate, polymerisation proceeding by transesterification with elimination of the volatile alcohol. Likewise practicable is preparation by a combination of transesterification and condensation. Furthermore, polyesters can be prepared by polycondensation of hydroxycarboxylic acids, for example 12-hydroxystearic acid and hydroxypivalic acid or the corresponding lactones such as ε-caprolactone. Examples of dicarboxylic acids and polyacids include terephthalic acid, isophthalic acid, adipic acid, azelaic acid, sebacic acid, 1,12-dodecane di-acid, pyromellitic acid, 3,6-dichlorophthalic acid, succinic acid, 1,3-cyclohexanedicarboxylic acid and 1,4-cyclohexanedicarboxylic acid. Examples of diols and polyols include ethylene glycol, propylene glycol, glycerol, hexanetriol, hexane-2,5-diol, hexane-1,6-diol, pentaerythritol, sorbitol, neopentyl glycol, trimethylolethane, trimethyolpropane, tris-1,4-cyclohexanedimethanol, trimethylpentanediol, 2,2-diethyl-1,3-propanediol, 2-methyl-2-butyl-1,3-propanediol, Esterdiol 204 (ester of hydroxypivalic acid and neopentyl glycol), hydrated bisphenol A, bisphenol A, hydroxypivalic acid, hydroxypivalate, 2-butyl-2-ethyl-1,3-propanediol, 1,4-butanediol, 2-butene-1,4-diol, 2-butyne-1,4-diol or 2-methyl-1,3-propanediol.

Suitable crosslinkers for carboxy-functional polyesters are epoxy compounds, for example novolak epoxy resins, diglycidyl ethers of bisphenol A, hydrated bisphenol A and bisphenol A modified by reaction with, for example, aliphatic dicarboxylic acids. Also suitable are reactive epoxy compounds such as triglycidyltriazolidine-3,5-dione, the glycidyl esters of polyacids, for example diglycidyl terephthalate and diglycidyl hexahydroterephthalate, hydantoin epoxides (U.S. Pat. No. 4,402,983) and, very particularly, triglycidyl isocyanurate and aliphatic polyepoxy compounds, such as Araldit® PT910 (Ciba Spezialit ätenchemie AG) and also epoxidised polyunsaturated fatty acid esters with alcohols, such as the Uranox® products of DSM. Other crosslinkers for carboxy-functional polyesters are β-hydroxyalkylamides (U.S. Pat. No. 4,076,917), for example the primarily tetrafunctional β-hydroxyalkylamide derivative of adipic acid (Primid® XL552 and Primid®QM1260, of Ems Chemie). Derivatives of melamine, benzoguanimine and glycoluril which are alkylated with low molecular weight alcohols have also been found to be suitable. Examples are tetramethylmethoxyglycoluril (Powderlink® 1174, of American Cyanamid). Other known crosslinkers are bis- and trisoxazolidines, such as 1,4-bisoxazolidinobenzene.

Recent substances are carboxy-functional polyesters which include chemically bonded epoxy groups and as a consequence are able to crosslink with themselves (Molhoek et al., 22nd Fatipec Congress, 15.–19.5.95, Budapest, Vol.1, 119–132).

Catalysts may be used in all those systems in which an epoxy group or a glycidyl radical reacts with a carboxyl group or with an anhydride in a crosslinking reaction. Examples are amines or metal compounds, such as aluminium acetylacetonate or tin octoate.

Particularly important crosslinkers for hydroxy-functional polyesters are the polyisocyanate crosslinkers. To prevent premature crosslinking owing to the high reactivity of isocyanates and to obtain good flow of the melted powder, the polyisocyanates are blocked (internally as a uretdione or as an adduct with a blocking agent). The blocking agents most often used are ε-caprolactam, methyl ethyl ketoxime or butanone oxime. Other suitable blocking agents for isocyanates are described in the publications of G. B. Guise, G. N. Freelandand G. C. Smith, J. Applied Polymer Science, 23, 353 (1979) and of M.Bock and H.-U. Maier-Westhues in "Progress in Product Development for Powder Coating Technology, XIX th Int. Conf. on Organic Coatings, Science and Technol., Athens, Jul. 12–16, 1993". Examples of blocked and unblocked polyisocyanates include 2-methylpentane-1,5-diisocyanate, 2-ethylbutane-1,4-diisocyanate, 3(4)-isocyanatomethyl-1-methylcyclohexyl isocyanate, 3-isocyanatomethyl-3,5,5-trimethylcyclohexane diisocyanate, tris(isocyanatomethyl)benzene, 4,4'-diisocyanatodicyclohexylmethane, 1,4-bis(isocyanatomethyl)cyclohexane, m-tetramethylxylenediisocyanate, p-tetramethylxylene diisocyanate and, in particular, isophorone diisocyanate. Deblocking is usually carried out by adding a metallic catalyst, for example tin octoate, dibutyltin oxide or dibutyltin dilaurate to the polyisocyanate formulation.

Other suitable crosslinkers for hydroxy-functional polyesters are anhydrides such as trimellitic acid anhydride and its reaction products with diols and diamines. Further examples of such crosslinkers are described by T. A. Misev in "Powder Coatings: Chemistry and Technology", Verlag J.Wiley & Sons, Chichester, pages 123 and 124.

Polyacrylates, which usually have hydroxyl, carboxyl or glycidyl functionality, are also used as binders for powder coatings. These are prepared by the customary methods, principally from monomers, for example styrenes and linear or branched $C_1$–$C_8$alkyl esters of acrylic acid or methacrylic acid. It is also possible to add and copolymerise other ethylenically unsaturated compounds, for example divinyl benzene, acrylamide, methacrylamide, butoxymethylacrylamide, acrylonitrile, butadiene and the like. Hydroxyl functionality is ensured by the copolymerisation of hydroxy-functional monomers, for example hydroxyethylacrylate, hydroxyethylmethacrylate, hydroxypropylacrylate, hydroxypropylmethacrylate. For carboxyl functionality, ethylenically unsaturated acids and anhydrides are used, for example acrylic acid, methacrylic acid, itaconic acid, crotonic acid, maleic anhydride, itaconic anhydride, acrylic anhydride or methacrylic anhydride (U.S. Pat. No. 3,836,604). Glycidyl functionality is obtained by copolymerising monomers such as glycidylacrylate and glycidyl methacrylate, as taught in EP-A-0 256 369 and U.S. Pat. No. 3,876,578. Crosslinkers for polyacrylates with hydroxyl or carboxyl functionality may be, in principle, the same compounds as described above for the polyesters with hydroxyl or carboxyl functionality. Further suitable crosslinkers are the epoxy compounds of U.S. Pat. No. 0,045,040. Suitable crosslinkers for polyacrylates with glycidyl functio-nality are dicarboxylic acids such as sebacic acid, 1,12-dodecanedicarboxylic acid, and anhydrides, for example bis-trimellitic acid anhydride and the compounds described in U.S. Pat. No. 3,880,946. In addition, self-crosslinking polyacrylates are known from DE-A-3 310 545.

Epoxy resins for powder coatings are usually either Novolace epoxy resins or, in particular, those based on aromatic polyols, in particular those based on bisphenols such as bisphenol. A. Furthermore, modified bisphenol epoxy resins are known from JP-A-58 187 464 (1982). The epoxy resins are used in combination with crosslinkers from the classes of the solid aliphatic amines, solid aromatic amines, amine adducts, phenolic resins, polyacids and the above-described carboxy-functional polyesters. Hardeners meriting very particular mention are the dicyandiamides which are often used together with a catalyst such as Lewis acids, boron trifluoride-amine complexes, metal complexes, tertiary or quaternary amines and imidazoline derivatives, such as 2-methylimidazoline.

Component (b) is conveniently used in an amount of 0.001 to 10% by weight, typically of 0.01 to 5% by weight, preferably of 0.025 to 3% by weight, more preferably of 0.05 to 3% by weight, based on the weight of component (a).

The novel powder coating compositions can contain other additives in addition to components (a) and (b).

Preferred powder coating compositions of this invention contain, as further additives, one or more than one component from the group consisting of pigments, dyes, fillers, flow control agents, degassing agents, charge control agents, optical brighteners, adhesion promoters, antioxidants, light stabilisers, curing catalysts, anticorrosive agents or photoinitiators.

Anticorrosive agents are, for example, anticorrosive pigments, such as phosphate- or borate-containing pigments or metal oxide pigments, or other organic or inorganic corrosion inhibitors, for example the salts of nitroisophthalic acid, phosphates, technical amines or substituted benzotriazoles.

Examples of degassing agents are fatty acid amides such as those described in EP-A-0 471 409, ε-caprolactam, methyl- and dimethylisophthalate (EP-A-284 996) and, very particularly, benzoin.

Examples of flow control agents are epoxidised fatty acids, abietyl alcohol, polylauryl methacrylate, polylauryl acrylate, polydimethylsiloxane-polyalkylene oxide block copolymers or, in particular, low molecular weight polymers and copolymers of $C_1$–$C_8$alkylacrylates or alkylmethacrylates.

Adhesion promoters are based, for example, on modified silanes, titanates or zirconates.

The pigments are, for example, titanium dioxide, barium sulfate, lithopones, iron oxide, carbon black, aluminium bronze, phthalocyanine blue or aminoanthraquinone.

Typical examples of fillers are talcum, aluminium oxide, aluminium silicate, aluminium phosphate, baryte, mica, silicium dioxide, calcium carbonate or magnesium carbonate, magnesium oxide, zinc oxide, zinc carbonate, zinc phosphate or mixtures thereof.

In addition to component (b), the novel powder coating compositions can contain further costabilisers (additives), such as the following:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroguinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl)adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2- methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphoslphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicvclohexvl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1 supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl) amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl) amino]ethane, 1,2-bis(phenylamino)propane, (o-tolyl) biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyidiphenylamines, a mixture of mono- and dialkylated dodecyldiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl) benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotrazole, 2-(3',5'-bis-(α,α-dimethylbenzyl)-2'-hydroxyphenyl) benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethyhexloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2(3'-tert-butyl-2'-hydroxy-5'-(2-octyloxycarbonylethyl)phenyl) benzotriazole, 2-(3'-tert-butyl-5'-[2-(2-ethylhexyloxy) carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

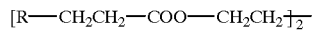

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)-phenyl]benzotriazole; 2-[2'-hydroxy-3'-(1,1,3,3-tetramethylbutyl)-5α-(α,α-dimethylbenzyl)phenyl] benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3, 5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2, 6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6, 6-tetramethyl-4-piperidyl)-1,2,3,4-butane-tetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decan-2,4-dione, bis (1-octyloxy-2,2,6,6-tetramethylpiperidyl)sebacate, bis (1-octyloxy-2,2,6,6-tetramethylpiperidyl)succinate, linear or cyclic condensates of N,N'-bis-(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6- tetramethylpiperidyl )-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl) pyrrolidin-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl) hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxymethylene-malonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanlide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy) phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3-dodecyloxy-propoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris [2-hydroxy-4-(3-butoxy-2-hydroxy-propoxy)phenyl]-1,3,5-triazine, 2-(2-hydroxyphenyl)-4-(4-methoxyphenyl)-6-phenyl-1 ,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene) oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl) phosphite, diisodecyl pentaerythritol diphosphite, bis (2,4-di-tert-butylphenyl)pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl) pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz-[d,g]-1,3,2-dioxaphosphocin, 6-fluoro-2,4,8,10-tetra-tert-butyl-12-methyl-dibenz[d,g]-1,3,2-dioxaphosphocin, bis(2,4-di-tert-butyl-6-methylphenyl)methyl phosphite, bis(2,4-di-tert-butyl-6-methylphenyl)ethyl phosphite, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite.

Especially preferred are the following phosphites:
Tris(2,4-di-tert-butylphenyl)phosphite (Irgafos®168, Ciba Spezialitätenchemie AG), tris(nonylphenyl)phosphite, (A)

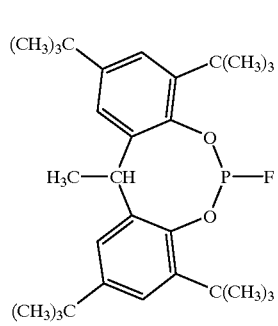

(B)

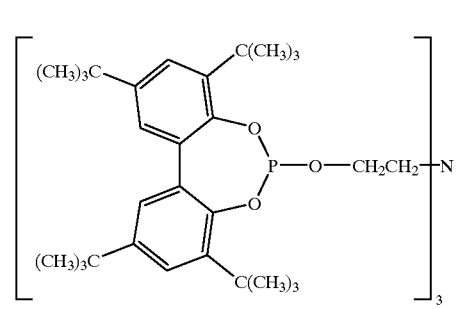

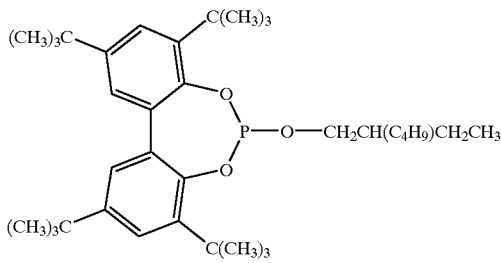

(C)

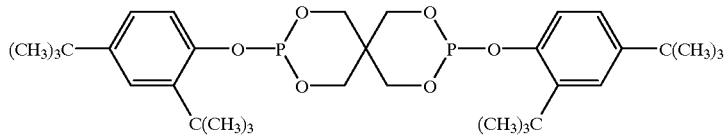

(D)

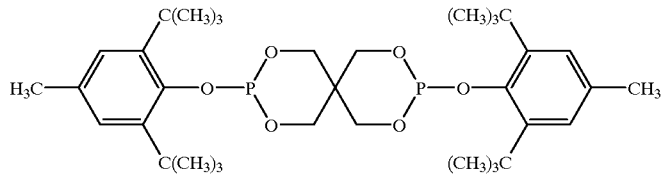

(E)

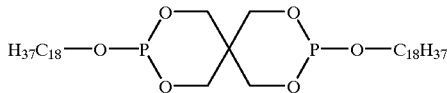

(F)

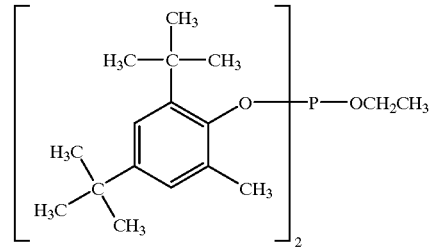

(G)

Tris(2,4-di-tert-butylphenyl)phosphite [Irgafos®168, Ciba Spezialitätenchemie AG], bis(2,4-di-tert-butyl-6-methylphenyl)ethyl phosphite [Irgafos®38, Ciba Spezialitätenchemie AG, formula (G)] und 2,2',2"-nitrilo-[triethyl-tris(3,3',5,5'-tetra-tert-butyl-1,1'-biphenyl-2,2'-diyl)phosphite [Irgafos®12, Ciba Spezialitätenchemie AG, formula (B)] are very particularly preferred.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dhexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenyl-nitrone, N-ethyl-alpha-methyl-nitrone, N-octyl-alpha-heptyl-nitrone, N-lauryl-alpha-undecyl-nitrone, N-tetradecyl-alpha-tridcyl-nitrone, N-hexadecyl-alpha-pentadecyl-nitrone, N-octadecyl-alpha-heptadecyl-nitrone, N-hexadecyl-alpha-heptadecyl-nitrone, N-ocatadecyl-alpha-pentadecyl-nitrone, N-heptadecyl-alpha-heptadecyl-nitrone, N-octadecyl-alpha-hexadecyl-nitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of p-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl-benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butylbenzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

The costabilisers are added in concentrations of, for example, 0.01 to 10%, preferably 0.025 to 3% by weight, more preferably 0.05 to 3% by weight, based on the weight of component (a).

Particularly preferred additional additives are phenolic antioxidants (item 1 in the list), sterically hindered amines (item 2.6 in the list), phosphites and phosphonites (item 4 in the list), thiosynergists (item 7 in the list) and/or benzofuran-2-ones (item 9 in the list).

The additional additives from the group of the phosphites and phosphonites preferably have a melting point in the range of 40–150° C., more preferably of 60–120° C., e.g. of 70–110° C. These preferred melting ranges facilitate the mixture with the components (a) and (b).

The cited additional additives are known compounds; many of them are commercially available.

When preparing the organic film-forming binder [component (a)] by polymerisation or polycondensation of monomers, the component (b) and the above additional additives can be admixed to the monomers already before the polymerisation.

The powder coating compositions are applied to the substrate by the customary processes, in particular by electrostatic powder spraying. The powder sprayed from the spray gun is electrostacially charged at a high-voltage electrode and drawn to the workpiece under the action of the air flow and of the electrostatic force of attraction. The wrap-around effect of the field lines ensures that edges and reverse sides too are coated. The powder coating compositions can also be applied triboelectrically to the substrates. The applied particles, which adhere as a result of Coulomb forces, are melted in the furnace and cured. The preferred stoving temperatures are in the range from 130 to 230° C., depending on the reactivity of the film-forming binder (resin/hardener system).

Preferred substrates are metallic substrates, for example iron, steel, copper, zinc, tin, magnesium, silicium, titanium or aluminium, and alloys thereof.

A preferred embodiment of this invention is the use of component (b) as stabiliser for reducing the discolouration of powder coating compositions which are heat-curable, especially in gas furnaces (stoving lacquers).

This invention also relates to a process for reducing the discolouration of heat-curable powder coating compositions which comprises incorporating in or applying to these compositions at least one component (b).

This invention likewise relates to a process for curing powder coating compositions comprising the components (a) and (b), which process comprises carrying out curing in a gas furnace.

In another of its aspects, this invention also relates to the coating films applied and cured by the above processes.

The preparation of a powder coating composition with the novel components (a) and (b) can be accomplished by the customary methods. A good description of the operations and the machines is given in chapter 5 of T. A. Misev's book: "Powder Coatings: Chemistry and Technology", Verlag J. Wiley & Sons, Chichester.

Usually, all components of the powder coating composition are weighed out and blended in a suitable mixer. The mixers used are eccentric tumble mixers, cone mixers, double-cone mixers, horizontal mixers, blenders and agitators such as double-motion agitators.

The formulation is first processed in a heated extruder to give a melted compound which is as homogeneous as possible. Apparatus suitable therefore are single-shaft ko-kneaders, twin-screw extruders and planetary extruders. Metering is usually effected by means of a screw conveyor, a conveyor belt or a shaker trough. Following extrusion the hot mass is rolled out and cooled, e.g. on a cooling belt. When the mass has solidified, it is crushed and then ground.

Suitable grinding mills are pin mills, ultracentrifugal mills, jet mills and, very particularly, classifying mills. The powder is subsequently classified and, preferably, sieved, small amounts of assistants, such as silica gel or aluminium oxides, possibly being added.

Other processes for the preparation of powder coatings have recently been disclosed (EP-B-368 851 or WO-A-92/00342) which can also be employed for this invention. In these processes the premixed formulation or extrudate is fed to a heated rotary tube and is spun out centrifugally on a rotary table. At the edge of the table, small, spherical and virtually monodisperse drops are formed which solidify in cooled air before falling to the ground.

One new process for preparing powder coating compositions consists in mixing components (a) and (b) with super-critical carbon dioxide and then removing the carbon dioxide by evaporation (see also U.S. Pat. No. 4,414,370 or 4,529,787). The stabilisers [component (b)] of this invention are also highly suitable for such processes for the preparation of powder coating compositions.

The powder coatings are applied by the methods customary in practice. It is possible, for example, to use corona guns and also triboelectric spray guns. It is furthermore possible to use all variants of the fluidised sintering process, with and without electrostatic charging. For thermoplastic powder coatings, flame spraying processes can also be employed.

The powder coating compositions can be stoved not only in the gas furnaces which are in the foreground of this application, but also by means of infrared heating or via electrical radiators.

The invention is further illustrated by the following Examples, in which parts or percentages are by weight.

EXAMPLE 1

Preparation of Compound (238) (Table 5)

0.80 ml (10.5 mmol) of acetyl chloride is added dropwise under nitrogen over 10 minutes at 10° C. to a solution consisting of 4.39 g (10.0 mmol) of 2,2'-ethylidene-bis(4,6-di-tert-butylphenol) [prepared e.g. according to EP-A-0 500 323, Example 1] and 1.32 g (13.0 mmol) of triethylamine in 50 ml of toluene. After the addition is complete, the reaction mixture is stirred for 2 hours at room temperature. The precipitated triethylamine hydrochloride is filtered off and the filtrate is concentrated in a vacuum rotary evaporator. The residue is crystallised from ethanol, affording 3.3 g (69%) of a white powder, m. p. 210–212° C. (compound (238), Table 5). Analysis calculated: C 79.95; H 10.06%. Analysis found: C 79.88; H 10.18%.

In general analogy to the procedure of Example 1, the compounds (240), (246) and (248) (Table 5) are obtained by replacing acetyl chloride with butyric acid chloride, decanoic acid chloride and lauric acid chloride. Compound (240) has an m.p. of 102–104° C. Analysis calculated: C 80.26; H 10.30%. Analysis found: C 80.05; H 10.42%. Compound (246) has an m.p. of 85–86° C. Analysis calculated: C 81.03; H 10.88%. Analysis found: C 81.04; H 10.96%. Compound (248) has an m.p. of 85–87° C. Analysis calculated: C 81.23; H 11.04%. Analysis found: C 80.98; H 11.24%.

EXAMPLE 2

Preparation of Compound (253) (Table 5)

A solution consisting of 5.86 g (35.2 mmol) of trans-cinnamic acid chloride in 30 ml of toluene is added dropwise at room temperature to a solution consisting of 15.42 g (35.2 mmol) of 2,2'-ethylidene-bis(4,6-di-tert-butylphenol) [prepared e.g. according to EP-A-0 500 323, Example 1] and 6.37 ml (45.7 mmol) of triethylamine in 100 ml of toluene.

After the addition is complete, the pale yellow suspension obtained is stirred for 3 hours at room temperature. The precipitated triethylamine hydrochloride is filtered off and the filtrate is concentrated in a vacuum rotary evaporator. The residue is crystallised from isopropanol, affording 18 g (90%) of a white powder, m.p. 195–198° C. (compound (253), Table 5). Analysis calculated: C 82.35; H 9.21%. Analysis found: C 82.38; H 9.29%.

In general analogy to the procedure of Example 2, compound (251) (Table 5) is obtained by replacing trans-cinnamic acid chloride with crotonic acid chloride. Compound (251) has an m.p. of 116–121° C. Analysis calculated: C 80.58; H 9.95%. Analysis found: C 80.49; H 10.04%.

EXAMPLE 3
Preparation of Compound (258) (Table 5)

A solution consisting of 8.94 g (16.0 mmol) of compound (259) (Table 5) [prepared e.g. according to U.S. Pat. No. 5,616,780, Examples 1 to 3) in 90 ml of ethyl acetate is hydrated for 1 hour with 0.9 g of 5% Pd/C catalyst at 20° C. The catalyst is then filtered over Celite and the filtrate is concentrated in a vacuum rotary evaporator. The residue is crystallised from 20 ml of ethyl acetate, affording 4.5 g (50%) of a white powder, m.p. 169–174° C. (compound (258), Table 5). Analysis calculated: C 81.38; H 10.06%. Analysis found: C 80.76; H 9.49%.

EXAMPLE 4
Preparation of Compound (265) (Table 5)

a) A solution consisting of 9.1 g (92.0 mmol) of maleic anhydride in 200 ml of methanol is refluxed, with stirring, for 1 hour. After cooling to room temperature, the reaction mixture is concentrated in a vacuum rotary evaporator. The crude maleic monomethyl ester (colourless liquid) is dissolved in 200 ml of toluene. 10 ml (136 mmol) of thionyl chloride are added to this solution and the reaction mixture is slowly heated over 40 minutes to 90° C. (evolution of $HCl+SO_2$) and is stirred for 2 hours at this temperature. Distillation of excess thionyl chloride and of toluene affords 14 g (100%) of the crude fumaric acid chloride monomethyl ester which is used directly.

b) A 500 ml sulfonation flask is charged under nitrogen with the acid chloride (92.0 mmol) described in Example (4a) and 36 g (82.0 mmol) of 2,2'-ethylidene-bis(4,6-di-tert-butylphenol) [prepared e.g. according to EP-A-0 500 323, Example 1] in 280 ml toluene. The solution is cooled to 5° C. and 16.7 ml (120 mmol) of triethylamine are slowly added dropwise. After the addition is complete, the reaction mixture is warmed to room temperature and stirred for 2 hours. The precipitated triethylamine hydrochloride is filtered off and the filtrate is concentrated in a vacuum rotary evaporator. Subjecting the residue to chromatography over silica gel (hexane/toluene 19:1 to 3:1) and crystallising the pure fractions from methanol affords 24 g (48%) of a white powder, m.p. 138–140° C., (compound (265), Table 5). Analysis calculated: C 76.33; H 9.15%. Analysis found: C 76.22; H 9.39%.

In general analogy to the procedure of Example 4a/4b, the compounds (266) (Table 5) and 632 (Table 16) are obtained by replacing methanol with ethanol and 1-octanol. Compound (266) has an m.p. of 132–134° C. Analysis calculated: C 76.56; H 9.28%. Analysis found: C 76.44; H 9.26%. Compound (632) has an m.p. of 70–73° C. Analysis calculated: C 77.73; H 9.94%. Analysis found: C 78.02; H 10.10%.

EXAMPLE 5
Preparation of Compound (269) (Table 5)

A 250 ml round-bottomed flask is charged with 16.6 g (38.0 mmol) of 2,2'-ethylidene-bis(4,6-di-tert-butylphenol) [prepared e.g. according to EP-A-0 500 323, Example 1], 5.38 g (50.0 mmol) of triethylamine and 150 ml of toluene. 7.56 g (45.5 mmol) of methyl 3-(chlorocarbonyl)-3-butenoate [preparation see e.g. B. R. Baker et al. J. Org. Chem. 17, 116–131 (1952)] are added dropwise to this solution at 10° C. The reaction mixture is warmed to room temperature and stirred for 1 hour. The reaction mixture is then filtered over Celite and the filtrate is concentrated in a vacuum rotary evaporator. The residue is crystallised from isopropanol, affording 15 g (72%) of a whiteish beige powder, m.p. 154–158° C. (compound (269), Table 5). Analysis calculated: C 76.05; H 9.48%. Analysis found: C 76.21; H 9.49%.

EXAMPLE 6
Preparation of Compound (605) (Table 15)

A 100 ml round-bottomed flask, equipped with thermometer, magnetic stirrer and condenser, is charged with 37.2 g (85.0 mmol) of 2,2'-ethylidene-bis(4,6-di-tert-butylphenol) [prepared e.g. according to EP-A-0 500 323, Example 1] and 12.47 g (46.0 mmol) of dodecane di-acid dichloride. This reaction mixture is heated to 140° C. (evolution of HCl) and stirred for 15 hours at this temperature. The reaction mixture is cooled and chromatographed over silica gel with the eluant hexane/toluene. The pure fractions are combined and concentrated in a vacuum rotary evaporator, resulting in 23.6 g (48%) of a pale yellow amorphous powder. The melting range is 74–79° C. (compound (605), Table 15).

EXAMPLE 7
Preparation of Compound (610) (Table 15)

A 100 ml round-bottomed flask is charged under nitrogen with 13.2 g (30.0 mmol) of 2,2'-ethylidene-bis(4,6-di-tert-butylphenol) [prepared e.g. according to EP-A-0 500 323, Example 1], 7.6 g (75.0 mmol) of triethylamine and 80 ml of dichloroethane. This solution is cooled to 10° C. and 2.1 ml (16.4 mmol) of fumaric acid dichloride are slowly added dropwise. After the addition is complete, the dark suspension obtained is heated to 60° C. and stirred for 7 hours at this temperature. The reaction mixture is then filtered over Celite and the filtrate is concentrated in a vacuum rotary evaporator. The residue is crystallised from hexane, affording 4.4 g (31%) of a beige powder, m.p. 258–262° C., (compound (610), Table 15). Analysis calculated: C 80.29; H 9.69%. Analysis found: C 80.55; H 9.78%.

EXAMPLE 8
Preparation of Compound (617) (Table 16)

A 200 ml round-bottomed flask is charged with 6.58 g (15.0 mmol) of 2,2'-ethylidene-bis-(4,6-di-tert-butylphenol) [prepared e.g. according to EP-A-0 500 323, Example 1], 2.4 g (16.5 mmol) of acetyllactic acid chloride [preparation see e.g. P. Babin et al., Bull. Soc. Chim. Fr. 1982, II, 125–128] and 50 ml of dichloroethane. 2.7 ml (20.0 mmol) of triethylamine are added dropwise to this solution at room temperature. The suspension obtained is stirred for 15 hours at room temperature. The reaction mixture is then filtered over Celite and the filtrate is concentrated in a vacuum rotary evaporator. The residue is crystallised from methanol, affording 4.8 g (58%) of a white powder, m.p. 106–114° C., (compound (617), Table 16). Analysis calculated: C 76.05; H 9.40%. Analysis found: C 75.59; H 9.44%.

EXAMPLE 9
Preparation of Compound (626) (Table 16)

2 ml of a 1.6 molar butyl lithium solution in hexane are added dropwise at 5° C. to a solution which is stirred under nitrogen and which consists of 1.38 g (10.0 mmol) of diethyl phosphite in 20 ml of tetrahydrofuran. After stirring the solution for 1 hour at room temperature, a solution consisting of 3.95 g (10.0 mmol) of 2,2'-methylene-bis(4-tert-butyl-6-methylphenol]monoacrylate [preparation see e.g. U.S. Pat. No. 5,616,780, Example 1] in 30 ml of tetrahydrofuran is slowly added dropwise. The colourless solution obtained is stirred for 4 hours at room temperature. Subsequently, the reaction mixture is poured on an aqueous saturated ammonium chloride solution and extracted several times with ethyl acetate. The organic phases are combined, dried over sodium sulfate and concentrated in a vacuum rotary evaporator. The residue is chromatographed over silica gel using the eluant hexane/ethyl acetate 19:1 to 9:1, affording 3.3 g (48%) of a white powder, m.p. 138–142° C., (compound (626), Table 16). Analysis calculated: C 67.65; H 8.51%. Analysis found: C 67.93; H 8.49%.

EXAMPLE 10
Preparation of Compound (627) (Table 16)

A 50 ml round-bottomed flask, equipped with magnetic stirrer, condenser and bubble counter, is charged with 2.35 g (4.0 mmol) of 3-chloropropionic acid-2,4-di-tert-butyl-6-[1-(3,5-di-tert-butyl-2-hydroxyphenyl)ethyl] phenyl ester [preparation see e.g. EP-A-0 716 076, Example 4a], 0.80 g (4.4 mmol) of triethylphosphite and 50 mg of sodium iodide. After heating the reaction mixture to 125° C., it is stirred for 1 hour at this temperature (evolution of ethyl-choride gas). The reaction mixture is cooled to about 60° C., diluted with 10 ml of hexane and filtered over Celite. Half of the solvent is distilled off, upon which the product crystallises out. The residue is filtered and dried under high vacuum, giving 1.6 g (64%) of a white powder, m.p. 146–147° C., (compound (627), Table 16). Analysis calculated: C 70.45; H 9.43%. Analysis found: C 70.19; H 9.55%.

EXAMPLE 11
Measuring the Discolouration of Powder Coatings Based on a Carboxy-Functional Polyester and Heat-Cured in Gas Furnaces To prepare the powder coating composition based on a carboxy-functional polyester, the components 1 to 5 (formulation without additives) or the components 1 to 6 (formulation comprising the stabilisers) are used in the indicated sequence (cf. Table 17).

TABLE 17

| Components | Examples (amounts in grammes) | |
| --- | --- | --- |
| | 11a | 11b to 11d |
| 1. Crylcoat ® 360[a] | 472.8 | 472.8 |
| 2. Araldit ® GT 7004[b] | 315.2 | 315.2 |
| 3. Resiflow ® PV 88[c] | 9.6 | 9.6 |
| 4. benzoin[d] | 2.4 | 2.4 |
| 5. titanium dioxide type R-KB-5[e] | 400.0 | 400.0 |
| 6. stabilisers (see Tables 1–16) | — | 8.0 |
| total: | 1200.0 | 1208.0 |

[a]Crylcoat ® 360, of UCB S.A., Drogenbos, Belgium (polyester).
[b]Araldit ® GT 7004, of Ciba Spezialitätenchemie AG, denotes a diglycidyl ether of bisphenol A (epoxy resin).
[c]Resiflow ® PV 88, of Worlee Chemie GmbH, Lauenburg, Germany (flow control agent).
[d]benzoin, of Fluka AG (degassing agent).
[e]titanium dioxide type R-KB-5, of Bayer AG, Leverkusen, Germany.

The components weighed out in this manner are mixed using a double-motion agitator. The mixture is then extruded and rolled out in a Buss PLK 46L ko-kneader at 125 revolutions/minute and at 40° C. (screw and intake zone) and 80° C. (kneading zone). The melting temperature during extruding is about 91° C. The powder coating composition is coarsely comminuted using a bench cutter and is ground in a Retsch ZM-1 ultracentrifugal mill, which is fitted with a 0.75 mm perforated disk sieve, at 15000 revolutions/minute. The powder is then sieved through a 125 µm sieve on a centrifugal sieve machine. The average particle size of the ready-to-spray powder is about 30 µm.

Using an ESB-Wagner triboelectric cup gun, the finished powder coating composition is sprayed onto white coil-coat aluminium sheets in a layer thickness of 120 µm. The coated sheets are heated for 1 minute such as to melt, but not to cure, the powder coating. The coated sheets are stoved for 15 minutes in a gas furnace having an $NO_2$ content of 80 ppm and a temperature of 180° C. and are then overbaked for another 45 minutes at the same temperature. The yellowness index (YI) of the samples is determined in accordance with ASTM D 1925-70. Low YI values denote little discolouration, high YI values severe discoloration of the samples. The less discolouration, the more effective the stabiliser. The results are compiled in Table 18.

TABLE 18

Curing for 45 minutes in a gas furnace at 180° C.

| | | Yellowness index after h | |
| --- | --- | --- | --- |
| Example | Stabiliser | 15 minutes | 60 minutes |
| Example 11a[f] | — | 4.5 | 5.0 |
| Example 11b[f] | Irganox ® 1076[h] | 6.0 | 7.1 |
| Example 11c[g] | compound (246) | 4.0 | 4.6 |
| Example 11d[g] | compound (263) | 4.2 | 4.6 |

[f]Comparison Examples.
[g]Examples of this invention.
[h]Irganox ® 1076 (Ciba Spezialitätenchemie AG) denotes a compound of formula A

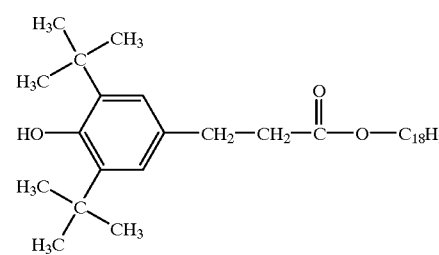

Irganox® 1076

EXAMPLE 12
Measuring the Discolouration of Cured Powder Coatings Based on a Carboxy-Functional Polyester With Araldit® PT910

To prepare the powder coating composition based on a carboxy-functional polyester with Araldit® PT910, the components 1 to 5 (formulation without additives) or the components 1 to 6 (formulation comprising the stabilisers) are used in the indicated sequence (cf. Table 19).

TABLE 19

| Components | Examples (amounts in grammes) | |
|---|---|---|
| | 12a | 12b to 12f |
| 1. Alftalat ® 9936/A[a)] | 893 | 893 |
| 2. Araldit ® PT910[b)] | 83 | 83 |
| 3. Resiflow ® PV 88[c)] | 20 | 20 |
| 4. benzoin[d)] | 4 | 4 |
| 5. titanium dioxide type 2160[e)] | 500 | 500 |
| 6. stabilisers (see Tables 1–16) | — | 8.93 |
| total: | 1500 | 1508.9 |

[a)]Atftalat ® 9936/A is a carboxy-funcitonal polyester, of Vianova Resins.
[b)]Araldit ® PT910, of Ciba Spezialitätnchemie AG, denotes a polyfunctional epoxy hardener consisting of a mixture of the glycidyl ehters of terephthalic acid and trimellitic acid.
[c)]Resiflow ® PV 88, of Worlee Chemie GmbH, Laurenburg, Germany (flow control agent).
[d)]benzoin, of Fluka AG (degassing agent).
[e)] titanium dioxide type 2160, of Kronos Titan International, Leverkusen, Germany.

The components weighed out in this manner are mixed using a double-motion agitator. The mixture is then extruded and rolled out in a Buss PLK 46L ko-kneader at 125 revolutions/minute and 40° C. (screw and intake zone)and 80° C. (kneading zone). The melting temperature during extruding is about 91° C. The powder coating composition is coarsely comminuted with a bench cutter and ground in a Retsch ZM-1 ultracentrifugal mill, fitted with a 0.75 mm perforated disk sieve, at 15000 revolutions/minute. The powder is then sieved through a 125 μm sieve on a centrifugal sieve machine. The average particle size of the ready-to-spray powder is about 30 μm.

Using an ESB-Wagner triboelectric cup gun, the finished powder coating composition is sprayed onto white coil-coat aluminium sheets in a layer thickness of 150 μm. The coated sheets are heated for 1 minute to melt, but not to cure, the powder layer. Half of the coated sheets are stoved for 15 minutes in a gas furnace having an $NO_2$ content of 80 ppm and at a temperature of 180° C. and are then overbaked for another 30 minutes at the same temperature. The other half of the coated sheets is stoved for 15 minutes in an electric furnace at a temperature of 180° C. and is then overbaked for another 30 minutes at the same temperature. The colour of the samples after stoving is measured using a spectrophotometer and taking b* as measure of yellowing. High b* values denote high yellowing. The less discolouration, the more effective the stabiliser. The results are compiled in Table 20.

TABLE 20

| | Curing for 45 minutes at 180° C. | | |
|---|---|---|---|
| | | b* after 45 min/180° C. | |
| Examples | Stabiliser | Electric furnace | Gas furnace |
| Example 12a[f)] | — | 1.17 | 1.50 |
| Example 12b[g)] | compound (246) | 1.07 | 1.30 |
| Example 12c[g)] | compound (240) | 1.06 | 1.40 |
| Example 12d[g)] | compound (634) | 1.01 | 1.36 |
| Example 12e[g)] | compound (238) | 1.09 | 1.40 |
| Example 12f[g)] | compound (110) | 0.97 | 1.33 |

[f)]Comparison Example.
[g)]Examples of this invention.

EXAMPLE 13

Measuring the Discolouration of Cured Powder Coatings Based on a Carboxy-Functional Polyester With Araldit® PT910.

The powder coating compositions according to Table 21 are prepared in analogy to Example 12.

TABLE 21

| Components | Examples (amounts in grammes) | |
|---|---|---|
| | 13a | 13b and 13c |
| 1. Alftalat ® 9936/A[a)] | 904 | 895 |
| 2. Araldit ® PT910[b)] | 84 | 83 |
| 3. Resiflow ® PV 88[c)] | 10 | 10 |
| 4. benzoin[d)] | 2 | 2 |
| 5. titanium dioxide type 2160[e)] | 500 | 500 |
| 6. stabilisers (see Tables 1–16) | — | 10 |
| total: | 1500 | 1500 |

Footnotes a) to e) see end of Table 19.

In analogy to Example 12, the finished powder coating composition is sprayed triboelectrically onto white coil-coat aluminium sheets in a layer thickness of 90 μm. One half of the coated sheets is stoved for 15 minutes in a gas furnace having an $NO_2$ content of 80 ppm and at a temperature of 180° C. and is then overbaked for another 20 minutes at a temperature of 215° C. The other half of the coated sheets is stoved for 15 minutes in an electric furnace at a temperature of 180° C. and is then overbaked for another 20 minutes at a temperature of 215° C. The colour of the samples after stoving is determined using a spectrophotometer and taking b* as measure of the yellowing. High b* values denote severe yellowing. The less discolouration, the more effective the stabiliser. The results are compiled in Table 22.

TABLE 22

| | Curing for 20 minutes at 215° C. | | |
|---|---|---|---|
| | | b* after 20 min/215° C. | |
| Examples | Stabiliser | Electric furnace | Gas furnace |
| Example 13a[f)] | — | 1.48 | 2.92 |
| Example 12b[g)] | compound (246) | 1.20 | 1.64 |
| Example 12c[g)] | compound (240) | 1.20 | 1.66 |

[f)]Comparison Example.
[g)]Examples of this invention.

What is claimed is:

1. A powder coating composition, which comprises a) an organic film-forming binder which is an epoxy resin, a polyester-hydroxyalkylamide, a polyester-glycoluril, an epoxy-polyester resin, a polyester-triglycidylisocyanurate, a hydroxy-functional polyester-blocked polyisocyanate, a hydroxy-functional polyester-uretdione, an acrylate resin with hardener or a mixture of such resins, and b) as stabiliser at least one compound of formula I

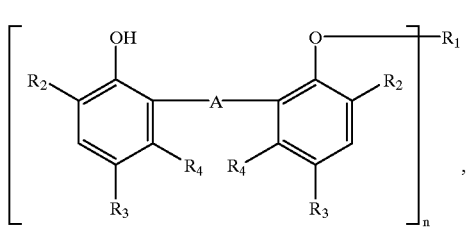

(I)

wherein, if n=1,
R$_1$ is hydrogen,

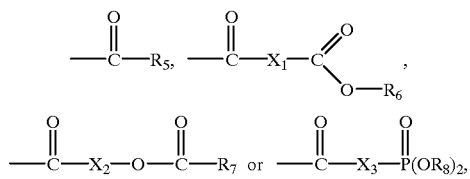

and if n=2,
R$_1$ is

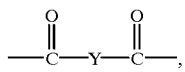

A is a direct bond, sulfur,

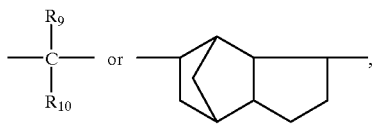

X$_1$ is a direct bond, C$_1$–C$_{24}$alkylene; C$_2$–C$_{24}$alkylene which is interrupted by oxygen, sulfur or

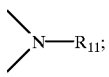

C$_2$–C$_{24}$alkenylene, C$_2$–C$_{20}$alkylidene, C$_7$–C$_{20}$phenylalkylidene, C$_5$–C$_{12}$cycloalkylene, C$_5$–C$_{12}$cycloalkenylene, C$_7$–C$_8$bicycloalkylene, unsubstituted or C$_1$–C$_4$alkyl-substituted phenylene,

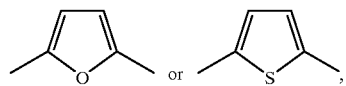

X$_2$ is C$_1$–C$_{24}$alkylene; C$_2$–C$_{24}$alkylene which is interrupted by oxygen, sulfur or

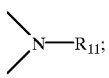

C$_2$–C$_{24}$alkenylene, C$_2$–C$_{20}$alkylidene, C$_7$–C$_{20}$phenylalkylidene, C$_5$–C$_{12}$cycloalkylene, C$_5$–C$_{12}$cycloalkenylene, C$_7$–C$_8$bicycloalkylene, unsubstituted or C$_1$–C$_4$alkyl-substituted phenylene,

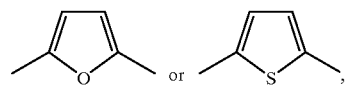

X$_3$ is C$_1$–C$_{24}$alkylene, C$_2$–C$_{20}$alkylidene, C$_7$–C$_{20}$phenylalkylidene or C$_5$–C$_{12}$cycloalkylene, Y is a direct bond, C$_1$–C$_{24}$alkylene; C$_2$–C$_{24}$alkylene which is interrupted by oxygen, sulfur or

C$_2$–C$_{24}$alkenylene, C$_2$–C$_{20}$alkylidene, C$_7$–C$_{20}$phenylalkylidene, C$_6$–C$_{12}$cycloalkylene, C$_5$–C$_{12}$cycloalkenylene, C$_7$–C$_8$bicycloalkylene, unsubstituted or C$_1$–C$_4$alkyl-substituted phenylene,

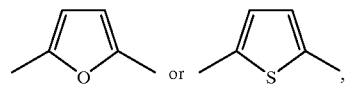

R$_2$ and R$_3$ are each independently of the other C$_1$–C$_{25}$alkyl, unsubstituted or C$_1$–C$_4$alkyl-substituted C$_5$–C$_{12}$cycloalkyl; C$_7$–C$_9$phenylalkyl, unsubstituted or C$_1$–C$_4$alkyl-substituted phenyl;

R$_4$ is hydrogen or methyl,

R$_5$ is C$_1$–C$_{25}$alkyl; C$_2$–C$_{25}$alkyl which is interrupted by oxygen, sulfur or

C$_2$–C$_{24}$alkenyl; C$_8$–C$_{30}$phenylalkenyl which is unsubstituted or substituted at the phenyl ring by halogen, C$_1$–C$_4$alkyl, C$_1$–C$_4$alkoxy or C$_1$–C$_4$alkylthio; unsubstituted or C$_1$–C$_4$alkyl-substituted C$_5$–C$_{12}$cycloalkyl; C$_8$–C$_{30}$phenylalkyl which is unsubstituted or substituted at the phenyl ring by halogen, C$_1$–C$_4$alkyl, C$_1$–C$_4$alkoxy or C$_1$–C$_4$alkylthio; phenyl which is unsubstituted or substituted by halogen, C$_1$–C$_4$alkyl, C$_1$–C$_4$alkoxy or C$_1$–C$_4$alkylthio:;

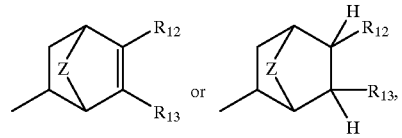

R$_6$ is C$_1$–C$_2$alkyl; C$_2$–C$_{25}$alkyl which is interrupted by oxygen, sulfur or

C$_2$–C$_{24}$alkenyl, unsubstituted or C$_1$–C$_4$alkyl-substituted C$_5$–C$_{12}$cycloalkyl; C$_7$–C$_9$phenylalkyl; phenyl which is unsubstituted or substituted by C$_1$–C$_4$alkyl, C$_1$–C$_4$alkoxy or C$_1$–C$_4$alkylthio;

R$_7$ is C$_1$–C$_{25}$alkyl; C$_2$–C$_{25}$alkyl which is interrupted by oxygen, sulfur or

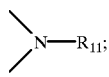

C$_2$–C$_{24}$alkenyl; C$_8$–C$_{30}$phenylalkenyl which is unsubstituted or substituted at the phenyl ring by halogen, C$_1$–C$_4$alkyl, C$_1$–C$_4$alkoxy or C$_1$–C$_4$alkylthio; unsubstituted or C$_1$–C$_4$alkyl-substituted C$_5$–C$_{12}$cycloalkyl; C$_9$–C$_{30}$phenylalkyl which is unsubstituted or substituted at the phenyl ring by halogen, C$_1$–C$_4$alkyl, C$_1$–C$_4$alkoxy or C$_1$–C$_4$alkylthio; phenyl which is unsubstituted or substituted by C$_1$–C$_4$alkyl, C$_1$–C$_4$alkoxy or C$_1$–C$_4$alkylthio;

R$_8$ is C$_1$–C$_{25}$alkyl,

R$_9$ and R$_{10}$ are each independently of the other hydrogen, CF$_3$, C$_1$–C$_{25}$alkyl or phenyl, or R$_9$ and R$_{10}$, together with the linking carbon atom, are a C$_5$–C$_{12}$cycloalkylidene ring which is unsubstituted or substituted by 1 to 3 C$_1$–C$_4$alkyl;

R$_{11}$ is hydrogen or C$_1$–C$_{18}$alkyl,

R$_{12}$ is hydrogen or C$_1$–C$_4$alkyl,

R$_{13}$ is hydrogen or C$_1$–C$_4$alkyl,

Z is oxygen, methylene, ethylidene or

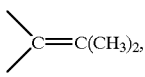

and n is 1 or 2.

2. A powder coating composition according to claim 1, wherein component (b) is a compound of formula I, wherein X$_1$ is a direct bond, C$_1$–C$_{18}$alkylene; C$_2$–C$_{18}$alkylene which is interrupted by oxygen, sulfur or

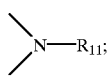

C$_2$–C$_{18}$alkenylene, C$_2$–C$_{12}$alkylidene, C$_7$–C$_{12}$phenylalkylidene, C$_5$–C$_8$cycloalkylene, C$_5$–C$_8$cycloalkenylene, phenylene,

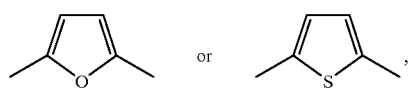

X$_2$ is C$_1$–C$_{18}$alkylene; C$_2$–C$_{18}$alkylene which is interrupted by oxygen, sulfur or

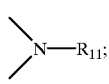

C$_2$–C$_{18}$alkenylene, C$_2$–C$_{12}$alkylidene, C$_7$–C$_{12}$phenylalkylidene, C$_5$–C$_8$cycloalkylene, C$_5$–C$_8$cycloalkenylene, phenylene,

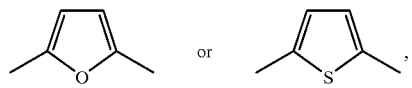

X$_3$ is C$_1$–C$_{18}$alkylene, C$_2$–C$_{12}$alkylidene, C$_7$–C$_{12}$phenylalkylidene or C$_5$–C$_8$cycloalkylene, Y is a direct bond, C$_1$–C$_{18}$alkylene; C$_2$–C$_{18}$alkylene which is interrupted by oxygen, sulfur or

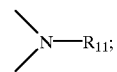

C$_2$–C$_{18}$alkenylene, C$_2$–C$_{12}$alkylidene, C$_7$–C$_{12}$phenylalkylidene, C$_5$–C$_8$cycloalkylene, C$_5$–C$_8$cycloalkenylene, phenylene,

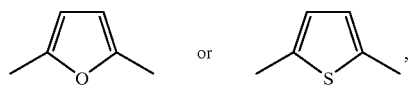

R$_2$ and R$_3$ are each independently of the other C$_1$–C$_{18}$alkyl, unsubstituted or C$_1$–C$_4$alkyl-substituted C$_5$–C$_8$cycloalkyl; C$_7$–C$_9$phenylalkyl or phenyl, R$_4$ is hydrogen or methyl, R$_5$ is C$_1$–C$_{18}$alkyl; C$_2$–C$_{18}$alkyl which is interrupted by oxygen, sulfur or

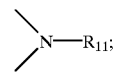

C$_2$–C$_{18}$alkenyl; C$_8$–C$_{18}$phenylalkenyl which is unsubstituted or substituted at the phenyl ring by halogen, C$_1$–C$_4$alkyl, C$_1$–C$_4$alkoxy or C$_1$–C$_4$alkylthio; C$_5$–C$_8$cycloalkyl; C$_8$–C$_{18}$phenylalkyl which is unsubstituted or substituted at the phenyl ring by halogen, C$_1$–C$_4$alkyl, C$_1$–C$_4$alkoxy or C$_1$–C$_4$alkylthio; phenyl which is unsubstituted or substituted by halogen, C$_1$–C$_4$alkyl, C$_1$–C$_4$alkoxy or C$_1$–C$_4$alkylthio;

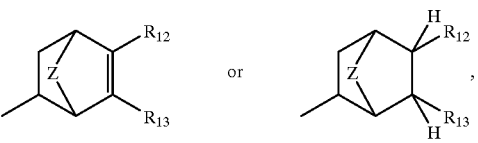

R$_6$ is C$_1$–C$_{18}$alkyl; C$_2$–C$_{18}$alkyl which is interrupted by oxygen, sulfur or

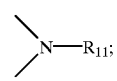

C$_2$–C$_{18}$alkenyl, C$_5$–C$_8$cycloalkyl, C$_7$–C$_9$phenylalkyl or phenyl,

R$_7$ is C$_1$–C$_{18}$alkyl; C$_2$–C$_{18}$alkyl which is interrupted by oxygen, sulfur or

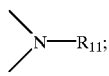

C$_2$–C$_{18}$alkenyl, C$_8$–C$_{18}$phenylalkenyl, C$_5$–C$_8$cycloalkyl, C$_9$–C$_{18}$phenylalkyl or phenyl, R$_8$ is C$_1$–C$_{18}$alkyl, R$_9$ and R$_{10}$ are each independently of the other hydrogen, C$_1$–C$_{18}$alkyl or phenyl, or R$_9$ and R$_{10}$, together with the linking carbon atom, are a C$_5$–C$_8$cycloalkylidene ring;

R$_{11}$ is hydrogen or C$_1$–C$_{12}$alkyl,

R$_{12}$ is hydrogen or C$_1$–C$_4$alkyl,

R$_{13}$ is hydrogen or C$_1$–C$_4$alkyl,

Z is oxygen, methylene or ethylidene, and n is 1 or 2.

3. A powder coating composition according to claim 1, wherein component (b) is a compound of formula I, wherein X$_1$ is C$_2$–C$_{12}$alkylene; C$_2$–C$_{12}$alkylene which is interrupted by oxygen; C$_2$–C$_{12}$alkenylene or phenylene, X$_2$ is C$_1$–C$_{12}$alkylene; C$_2$–C$_{12}$alkylene which is interrupted by oxygen; C$_2$–C$_{12}$alkenylene, C$_2$–C$_8$alkylidene or phenylene, X$_3$ is C$_1$–C$_{12}$alkylene, Y is a direct bond, C$_1$–C$_{18}$alkylene; C$_2$–C$_{18}$alkylene which is interrupted by oxygen; C$_2$–C$_{12}$alkenylene, cyclohexylene or phenylene, R$_2$ and R$_3$ are each independently of the other C$_1$–C$_{12}$alkyl, unsubstituted or methyl-substituted cyclohexyl; C$_7$–C$_9$phenylalkyl or phenyl, R$_4$ is hydrogen or methyl, R$_5$ is C$_1$–C$_{18}$alkyl; C$_2$–C$_{12}$alkyl is interrupted by oxygen; C$_2$–C$_{14}$alkenyl; C$_8$–C$_{14}$phenylalkenyl which is unsubstituted or substituted at the phenyl ring by chloro, methyl or methoxy; cyclohexyl; C$_8$–C$_{14}$phenylalkyl which is unsubstituted or substituted at the phenyl ring by chloro, methyl or methoxy; phenyl which is unsubstituted or substituted by chloro, methyl or methoxy;

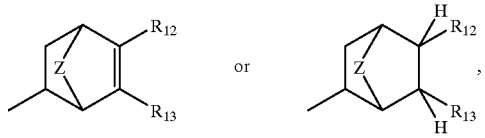

R$_6$ is C$_1$–C$_{12}$alkyl; C$_2$–C$_{12}$alkyl which is interrupted by oxygen; or C$_5$–C$_8$cycloalkyl, R$_7$ is C$_1$–C$_{12}$alkyl; C$_2$–C$_{12}$alkyl which is interrupted by oxygen; or phenyl, R$_8$ is C$_1$–C$_{12}$alkyl, R$_9$ and R$_{10}$ are each independently of the other hydrogen, C$_1$–C$_{12}$alkyl or phenyl, or R$_9$ and R$_{10}$, together with the linking carbon atom, are a cyclohexylidene ring;

R$_{12}$ is hydrogen or methyl,

R$_{13}$ is hydrogen or methyl,

Z is oxygen or methylene, and n is 1 or 2.

4. A powder coating composition according to claim 1, wherein component (b) is a compound of formula I, wherein X$_1$ is ethylene or C$_2$–C$_3$alkenylene, X$_2$ is methylene or ethylidene, X$_3$ is ethylene, Y is a direct bond, C$_1$–C$_{12}$alkylene, C$_2$–C$_4$alkenylene, cyclohexylene or phenylene, R$_2$ is C$_1$–C$_5$alkyl, R$_3$ is C$_1$–C$_5$alkyl, R$_4$ is hydrogen or methyl, R$_5$ is C$_1$–C$_{12}$alkyl; C$_4$–C$_8$alkyl which is interrupted by oxygen; C$_2$–C$_{10}$alkenyl; C$_8$–C$_{10}$phenylalkenyl which is unsubstituted or substituted at the phenyl ring by methoxy; cyclohexyl, unsubstituted or chloro- or methoxy-substituted phenyl;

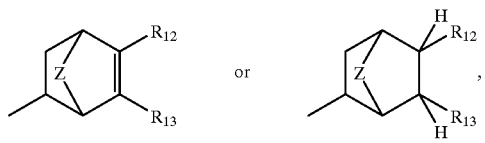

R$_6$ is C$_1$–C$_8$alkyl or cyclohexyl,

R$_7$ is C$_1$–C$_4$alkyl,

R$_8$ is C$_1$–C$_4$alkyl,

R$_9$ is hydrogen,

R$_{10}$ is hydrogen or methyl,

R$_{12}$ is hydrogen or methyl,

R$_{13}$ is hydrogen or methyl,

Z is oxygen or methylene, and n is 1 or 2.

5. A powder coating composition according to claim 1, wherein component (b) is a compound of formula I, wherein if n=1,

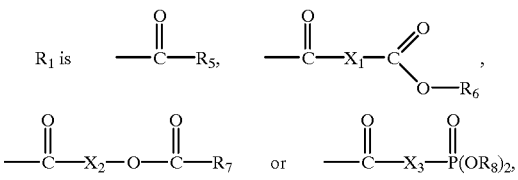

and if n=2,

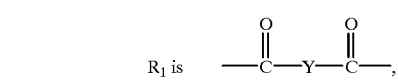

A is a direct bond or

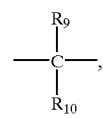

X$_1$ is ethylene or C$_2$–C$_3$alkenylene,

X$_2$ is methylene or ethylidene,

X$_3$ is ethylene,

Y is C$_6$–C$_{10}$alkylene or vinylene,

R$_2$ is tert-butyl, $R_3$ is $C_1$–$C_4$alkyl,
$R_4$ is hydrogen,
$R_5$ is $C_1$–$C_{12}$alkyl; $C_4$–$C_8$alkyl which is interrupted by oxygen; $C_2$–$C_4$alkenyl, $C_8$–$C_{10}$phenylalkenyl or

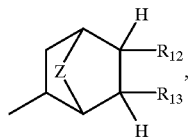

$R_6$ is $C_1$–$C_4$alkyl,
$R_7$ is $C_1$–$C_4$alkyl,
$R_8$ is $C_1$–$C_4$alkyl,
$R_9$ is hydrogen,
$R_{10}$ is hydrogen or methyl,
$R_{12}$ is hydrogen,
$R_{13}$ is hydrogen,
Z is methylene, and
n is 1 or 2.

6. A powder coating composition according to claim 1, which comprises one or more than one additional additives selected from the group consisting of pigments, dyes, fillers, flow control agents, degassing agents, charge control agents, optical brighteners, adhesion promotors, antioxidants, light stabilisers, curing calysts, anticorrosive agents and photo-initiators besides the components (a) and (b).

7. A powder coating composition according to claim 6, wherein the additional additives are phenolic antioxidants, sterically hindered amines, organic phosphites or phosphonites; thiosynergists and/or benzofuran-2-ones.

8. A powder coating composition according to claim 1, which comprises component (b) in an amount of 0.001 to 10%, based on the weight of component (a).

9. A powder coating composition according to claim 1, wherein the powder coating composition is a heat-curable powder coating composition.

10. A powder coating composition according to claim 1, wherein the powder coating composition is a powder coating composition which is heat-curable in gas furnaces.

11. A powder coating composition which during curing is in contact with nitrogen oxides originating from the combustion gases and which comprises the components (a) and (b) as claimed in claim 1.

12. A process for reducing the discolouration of heat-curable powder coating compositions, which comprises incorporating in or applying to these compositions at least one component (b) according to claim 1.

13. A process for curing powder coating compositions comprising the components (a) and (b) according to claim 1, which comprises carrying out the cure in a gas furnace.

* * * * *

UNITED STATES PATENT AND TRADEMARK OFFICE
CERTIFICATE OF CORRECTION

PATENT NO. : 6,103,794
DATED : August 15, 2000
INVENTOR(S) : Hugh Stephen Laver et al.

It is certified that error appears in the above-indentified patent and that said Letters Patent is hereby corrected as shown below:

On the title page, section [75] should read:

-- [75] Inventors: Hugh Stephen Laver, Reinach;
Rita Pitteloud, Praroman, both of Switzerland --.

Signed and Sealed this

Twenty-fourth Day of April, 2001

*Attest:*

*Attesting Officer*

NICHOLAS P. GODICI

*Acting Director of the United States Patent and Trademark Office*